US007410594B2

(12) United States Patent
Gisler et al.

(10) Patent No.: US 7,410,594 B2
(45) **Date of Patent: *Aug. 12, 2008**

(54) TRICHROMATIC DYEING PROCESS AND DYE MIXTURES USED THEREIN

(75) Inventors: Markus Gisler, Rheinfelden (CH); Roland Wald, Huningue (FR)

(73) Assignee: Clariant Finance (BVI) Limited, Tortola (VG)

(*) Notice: Subject to any disclaimer, the term of this patent is extended or adjusted under 35 U.S.C. 154(b) by 199 days.

This patent is subject to a terminal disclaimer.

(21) Appl. No.: 10/492,869

(22) PCT Filed: Oct. 14, 2002

(86) PCT No.: PCT/IB02/04216

§ 371 (c)(1), (2), (4) Date: Apr. 16, 2004

(87) PCT Pub. No.: WO03/033600

PCT Pub. Date: Apr. 24, 2003

(65) Prior Publication Data

US 2004/0250358 A1 Dec. 16, 2004

(30) Foreign Application Priority Data

Oct. 17, 2001 (GB) ................................ 0124842.6

(51) Int. Cl.

*C07D 251/48* (2006.01)
*C09B 26/06* (2006.01)
*C09B 62/04* (2006.01)
*C09B 67/22* (2006.01)
*D06P 1/382* (2006.01)

(52) U.S. Cl. .................... 252/8.61; 252/8.63; 252/8.91; 544/208; 524/100

(58) Field of Classification Search ................. 544/208; 524/100; 252/8.61, 8.63, 8.91
See application file for complete search history.

(56) References Cited

U.S. PATENT DOCUMENTS

| | | | | |
|---|---|---|---|---|
| 4,402,704 | A | 9/1983 | Raisin et al. | |
| 4,911,735 | A | 3/1990 | von der Eltz et al. | |
| 4,935,500 | A | 6/1990 | Omura et al. | |
| 5,032,142 | A | 7/1991 | Egger et al. | |
| 5,092,905 | A | 3/1992 | Dore' | |
| 5,292,870 | A * | 3/1994 | Anderton | 534/638 |
| 5,319,074 | A | 6/1994 | Reddig et al. | |
| 5,928,386 | A | 7/1999 | Hurter et al. | |
| 5,938,796 | A | 8/1999 | Negri et al. | |
| 5,989,298 | A | 11/1999 | Lehmann | |
| 6,458,936 | B2 | 10/2002 | Gisler | |
| 7,091,328 | B2 * | 8/2006 | Wald et al. | 534/638 |
| 2004/0049863 | A1 | 3/2004 | Stakelbeck et al. | |

FOREIGN PATENT DOCUMENTS

| | | | |
|---|---|---|---|
| DE | 26 23 178 | A1 | 2/1977 |
| DE | 42 41 918 | A1 | 6/1993 |
| EP | 0 083 299 | A1 | 7/1983 |
| EP | 0 084 314 | A2 | 7/1983 |
| EP | 0 099 721 | A1 | 2/1984 |
| EP | 0 149 170 | A2 | 7/1985 |
| EP | 0 226 982 | A2 | 7/1987 |
| EP | 0 497 174 | A1 | 8/1992 |
| EP | 0 808 940 | A2 | 11/1997 |
| EP | 0 877 116 | A2 | 11/1998 |
| EP | 0 969 051 | A1 | 1/2000 |
| GB | 2 262 532 | A | 6/1993 |
| JP | 2001-200174 | A | 7/2001 |
| WO | WO 99/63055 | A1 | 12/1999 |
| WO | WO 99/63995 | A1 | 12/1999 |
| WO | WO 01/68775 | A2 | 9/2001 |

OTHER PUBLICATIONS

Arkai et al., JP2001-200174-Computer Translation in English.*
English abstract for DE 26 23 178.
English asbtract for EP 0 084 314.
English abstract for EP 0 149 170.
F. Lehr, "Synthesis and Application of Reactive Dyes with Heterocyclic Reactive Systems," Dyes and Pigments, 14 (1990), pp. 239-263, Elsevier Publishers, Great Britain.
English abstract for JP 2001-200174.
International Search Report PCT/IB 02/04216 mail dated Feb. 4, 2003.
International Preliminary Examination Report for PCT/IB 02/04216 mail dated Jan. 30, 2004.

* cited by examiner

*Primary Examiner*—Venkataraman Balasubram
(74) *Attorney, Agent, or Firm*—Tod A. Waldrop

(57) ABSTRACT

The present invention relates to a process for the trichromatic dyeing or printing of hydroxy-group-containing or nitrogen-containing organic substrates with dye mixtures and also to such dye mixtures and hydroxy-group-containing or nitrogen-containing organic substrates dyed or printed therewith.

15 Claims, No Drawings

TRICHROMATIC DYEING PROCESS AND DYE MIXTURES USED THEREIN

The present invention relates to a process for the trichromatic dyeing or printing hydroxy-group-containing or nitrogen-containing organic substrates with dye mixtures and also to such dye mixtures and hydroxy-group-containing or nitrogen-containing organic substrates dyed or printed therewith.

Trichromatic describes the additive colour mixing of suitable yellow- or orange-, red- and blue-dyeing dyes with which any desired shade in the visible spectrum can be obtained by suitably selecting the amount ratios for the dyes.

Trichromatic dyeing is well known from the literature for various dye classes, for example from EP 83299, DE 2623178, EP 226982 and EP808940.

Optimum trichromatic performance of any yellow (or orange), red and blue dye mixture is crucially dependent on the neutral affinity and migration characteristics. Dyes having identical or very similar characteristics with regard to neutral affinity and migration are highly compatible with regard to trichromatic performance.

It is an object of the present invention to provide a trichromatic dyeing process and associated trichromatic dye mixtures consisting of at least one red component, at least one yellow (or orange) component and at least one blue component whereby trichromatic dyeing with good fastnesses is obtained.

This object is achieved by a trichromatic dyeing process which is characterized by using a dye mixture comprising at least one red-dyeing compound of the formula (I)

(I)

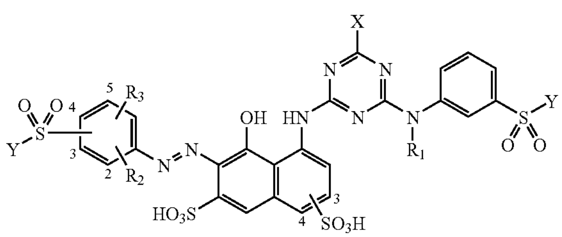

wherein $R_1$ is a $C_{1-4}$-alkyl group or a substituted $C_{2-4}$-alkyl group, $R_2$ and $R_3$ are independently from each other H; —OH; —CN; $C_{1-2}$-alkyl; —$SO_3H$; —COOH; —$OC_{1-2}$-alkyl or —$NH_2$, X is a halogen radical and Y —CH═$CH_2$ or —$CH_2CH_2$-Z, wherein Z is a radical which can be eliminated by alkali, and at least one yellow (or orange)-dyeing compound;

and at least one blue-dyeing compound.

Various auxiliaries, such as surface-active compounds, solubilising agents, thickeners, gel-forming substances, antioxidants, penetration agents, sequestering agents, buffers, light protection agents, care agents may additionally be present in the composition according to the invention.

Such auxiliaries are in particular wetting agents, antifoams, levelling agents, thickeners and plasticizers.

For the preparation of inks for printing processes suitable organic solvents or mixtures thereof are used. E.g. alcohols, ethers, esters, nitriles, carbonacidamides, cyclic amides, urea, sulfones and sulfone oxides.

Furthermore additional auxiliaries such as e.g. compounds, which adjust the viscosity and/or the surface tension, may be added to the ink composition.

Suitable yellow (or orange)-dyeing compounds for the inventive trichromatic process have the following formula (II)

(II)

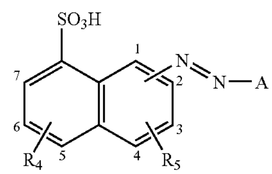

wherein $R_4$ and $R_5$ signify independently from each other H or —$SO_3H$,

A signifies a group of formula (i) or (ia)

(i)

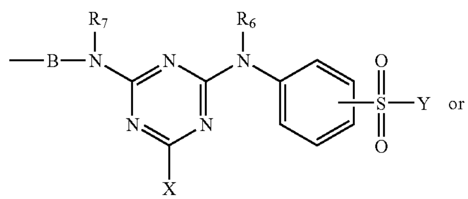

(ia)

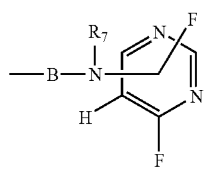

wherein

X and Y have the same meanings as defined above, $R_6$ and $R_7$ signify independently from each other H; unsubstituted $C_{1-4}$alkyl or substituted $C_{1-4}$alkyl, B signifies (ii)

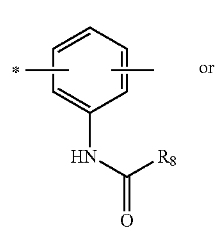

(iii)

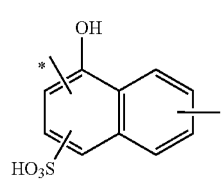

wherein $R_8$ $C_{1-4}$alkyl; —$NH_2$ or —$NHC_{1-4}$alkyl, and the asterisk marks the bond to the —N═N— group.

Further suitable yellow (or orange)-dyeing compounds for the inventive trichromatic process have the following formula (111)

(III)

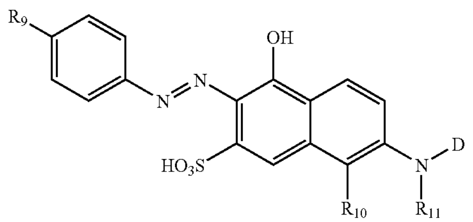

wherein $R_9$ —$SO_3H$ or —$SO_2Y$, wherein Y has the same definition as above, $R_{10}$ H or —$SO_3H$, $R_{11}$ H; unsubstituted $C_{1-4}$alkyl or substituted $C_{1-4}$alkyl, D signifies (iv)

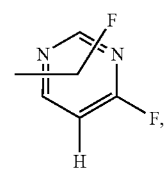

(iva)

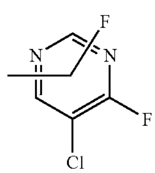

or (v)

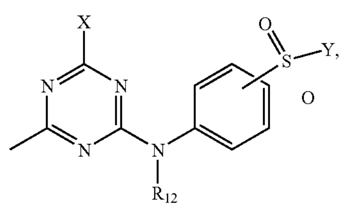

wherein

X and Y have the same meanings as defined above and $R_{12}$ signifies H; unsubstituted $C_{1-4}$alkyl or substituted $C_{1-4}$alkyl.

Further suitable yellow (or orange)-dyeing compounds for the inventive trichromatic process have the following formula (IV)

(IV)

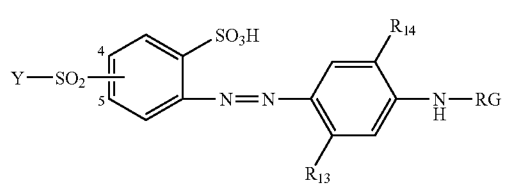

wherein $R_{13}$ H signifies; methyl; methoxy, ethoxy; —$NHCONH_2$ or —$NHCOCH_3$, $R_{14}$ H signifies; methyl; methoxy or ethoxy, RG signifies (vi)

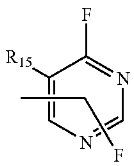

or (vii)

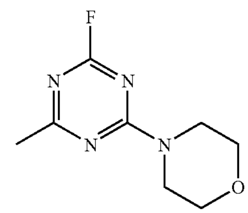

wherein $R_{15}$ signifies H or chlorine,

Y has the same definition as above and may be bonded in a meta- or in para-position with respect to the azo group.

Suitable blue-dyeing compounds for the inventive trichromatic process have the following formula (V)

(V)

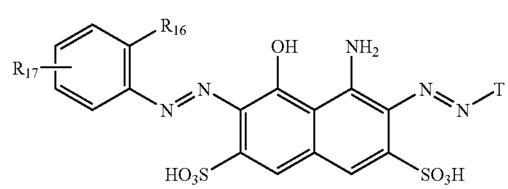

wherein $R_{16}$ signify H or —$SO_3H$ and $R_{17}$ signifies (viii)

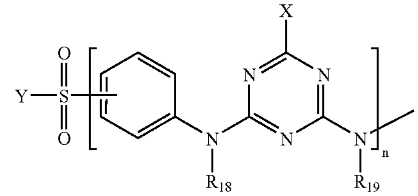

wherein

X and Y have the same meanings as defined above, $R_{18}$ and $R_{19}$ are independently from one another H; unsubstituted $C_{1-4}$alkyl or substituted $C_{1-4}$alkyl, n is 0 or 1, T signifies (ix)

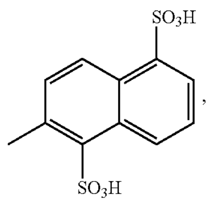

(x)

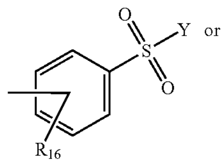

(xi)

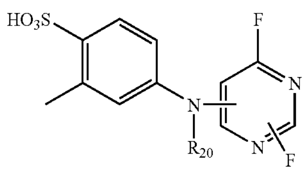

wherein $R_{16}$ and Y have the meanings as defined above and $R_{20}$ is H; unsubstituted $C_{1-4}$alkyl or substituted $C_{1-4}$alkyl.

Further suitable blue-dyeing compounds for the inventive trichromatic process have the following formula (VI)

(VI)

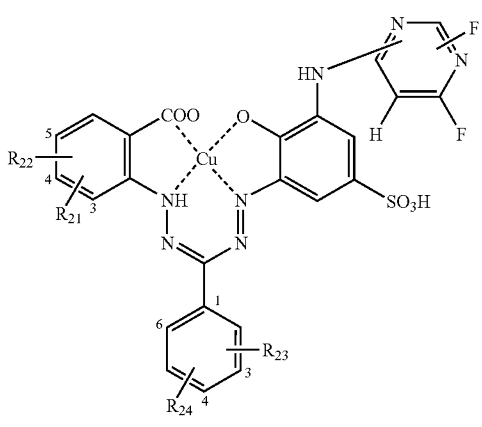

in which $R_{21}$ is H or —COOH, each of $R_{22}$ and $R_{24}$ is independently H; —COOH; —$SO_3$H; —$NHCOCH_3$; —$NHCOCHY_2$—$CH_2Y_1$; —$NHCOCY_2$═$CH_2$ or —$NHCOCH_2Y_1$, $R_{23}$—COOH, $Y_1$ is chlorine; bromine; —$OSO_3$H or —$SSO_3$H and $Y_2$ is H; chlorine or bromine.

Further suitable blue-dyeing compounds for the inventive trichromatic process have the following formula (VII)

(VII)

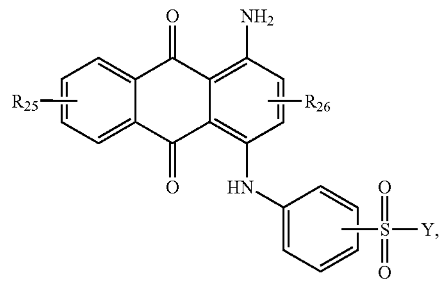

in which

Y has the same meanings as defined above, $R_{25}$ H or —$SO_3$H, $R_{26}$ H or —$SO_3$H.

Further suitable blue-dyeing compounds for the inventive trichromatic process have the following formula (VIII)

(VIII)

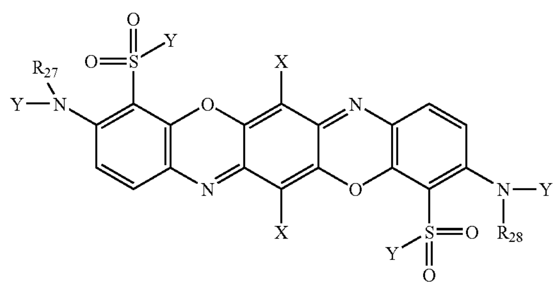

wherein each Y has independently from each other the same meanings as defined above $R_{27}$ and $R_{28}$ are independently from each other H; unsubstituted $C_{1-4}$alkyl or substituted $C_{1-4}$alkyl.

A preferred trichromatic dyeing process is characterized by using a dye mixture comprising at least one red-dyeing compound of the formula (Ia)

(Ia)

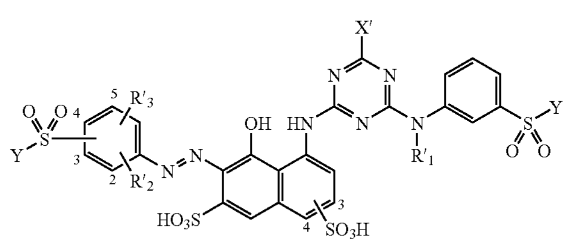

wherein

X' is Cl or F, $R'_1$ is a $C_{1-2}$-alkyl, especially —$C_2H_5$, or a $C_{2-4}$-alkyl group, which is monosubstituted by Cl, F, Br, —OH, —CN or —$NH_2$, R'$_2$ and R'$_3$ are independently from each other H; $C_{1-2}$-alkyl; —$SO_3H$ or —$OC_{1-2}$alkyl, especially H; —$CH_3$; —$SO_3H$ or —$OCH_3$ and the —$SO_2Y$ group is attached to the phenylring at position 3, 4 or 5, wherein Y is as defined above and at least one yellow (or orange)-dyeing compound of the formula (II), (III) and/or (IV) and at least one blue-dyeing compound as per the formula (V), (VI), (VII) and/or (VIII).

A more preferred trichromatic dyeing process is characterized by using a dye mixture comprising at least one yellow (or orange)-dyeing compound of formula (IIa), (IIb) and/or (IIc)

(IIa)

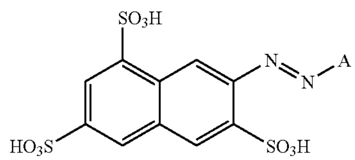

(IIb)

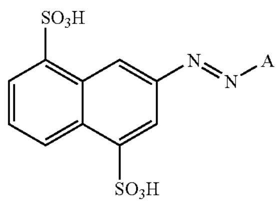

(IIc)

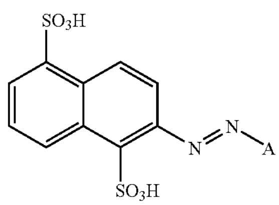

wherein A is $A_1$

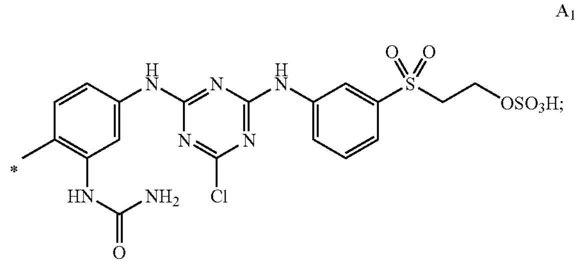

$A_2$

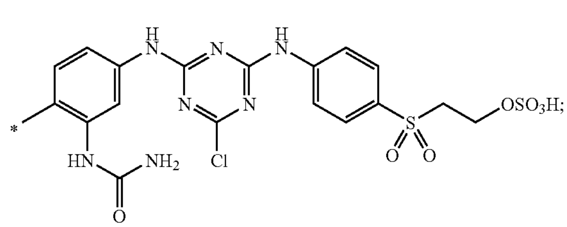

-continued $A_3$

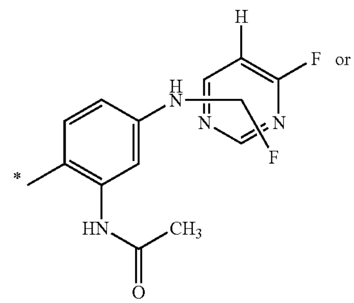

$A_4$

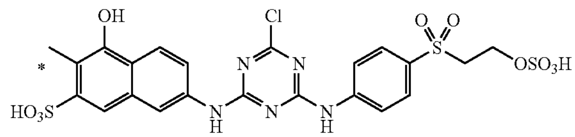

and/or at least one yellow (or orange)-dyeing compounds of formula (IIIa) or (IIIb)

(IIIa)

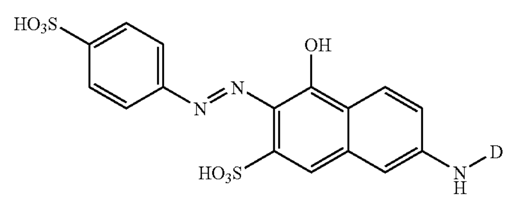

or (IIIb)

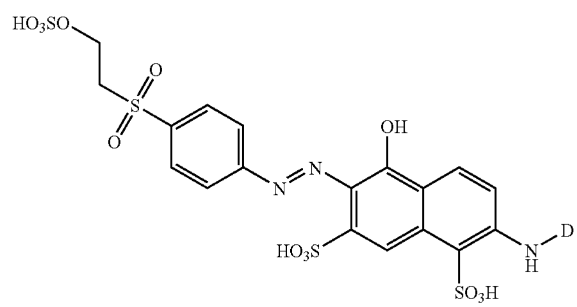

wherein D is $D_1$

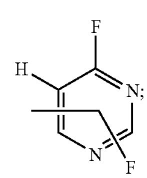

-continued
D2
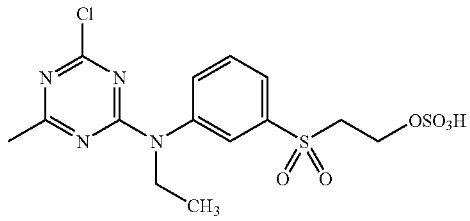
or
D3
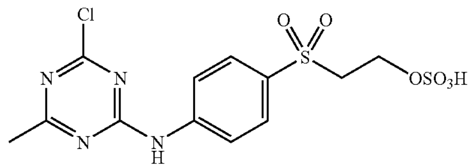
and/or at least one yellow (or orange)-dyeing compounds of formula (IVa) or (IVb)
(IVa)
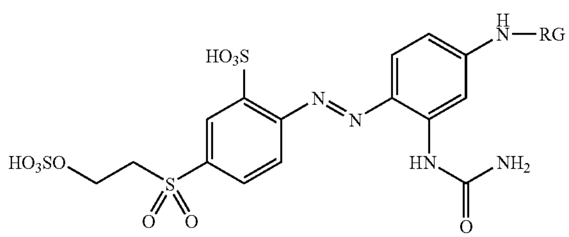
-continued
(IVb)
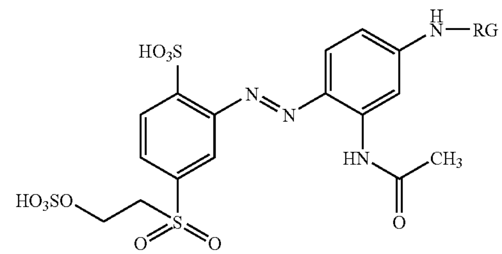
wherein RG is
$RG_1$
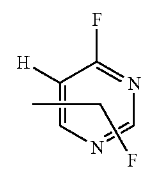
or
$RG_2$
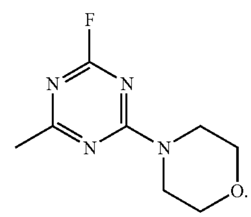
A more preferred trichromatic dyeing process is characterized by using a dye mixture comprising and/or at least one blue-dyeing compound of formula (Va), (Vb), (Vc), (Vd), (Ve) and/or (Vf)
(Va)
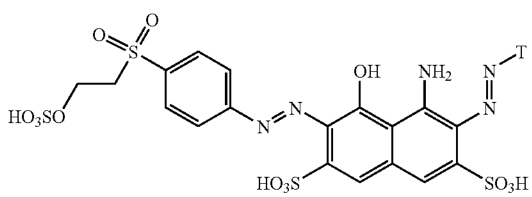
(Vb)
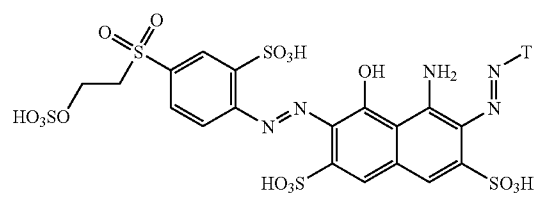
(Vc)
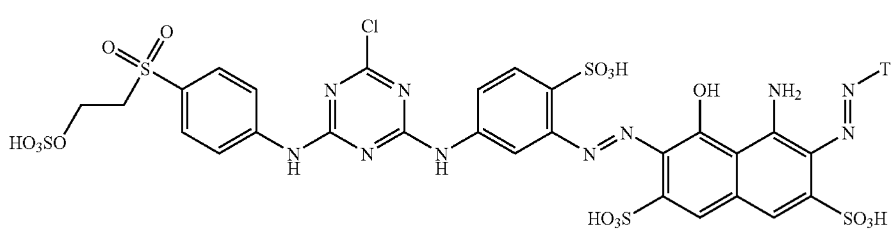
(Vd)
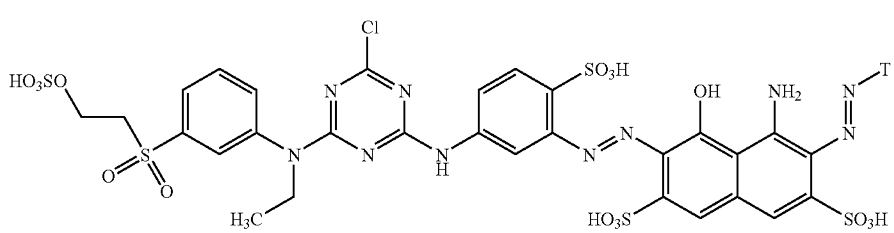

-continued
(Ve)
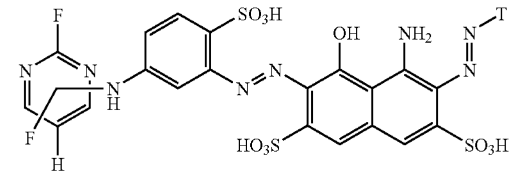
(Vf)
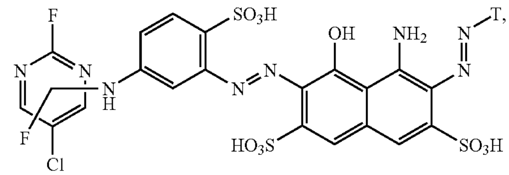
wherein T is
$T_1$
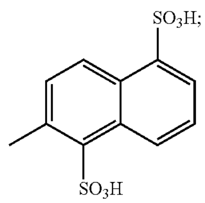
$T_2$
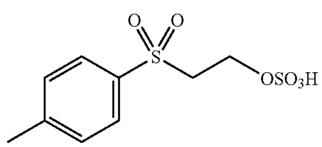
or
$T_3$
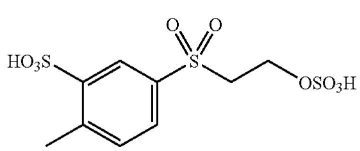
and/or at least one blue-dyeing compounds of formula (VIa) or (VIb)
(VIa)
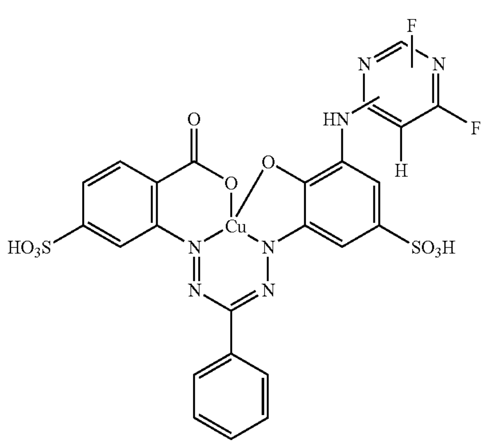
-continued
(VIb)
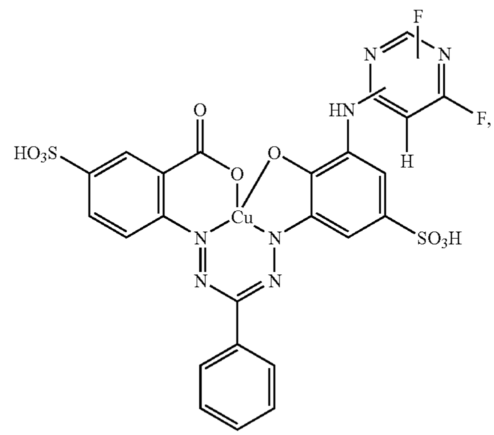
and/or at least one blue-dyeing compounds of formula (VIIa) or (VIIb)
(VIIa)
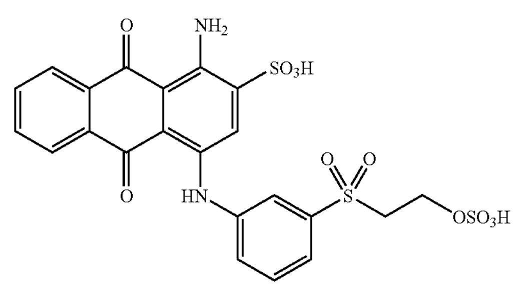
(VIIb)
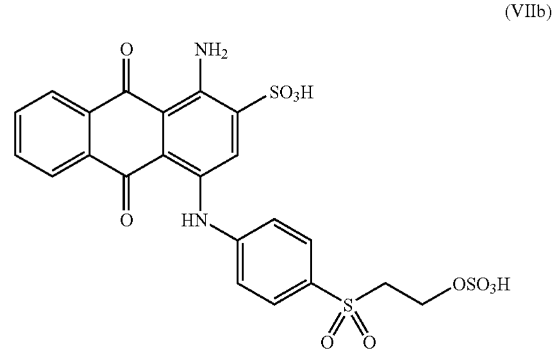

and/or at least one blue-dyeing compound of formula (VIIIa)

(VIIIa)

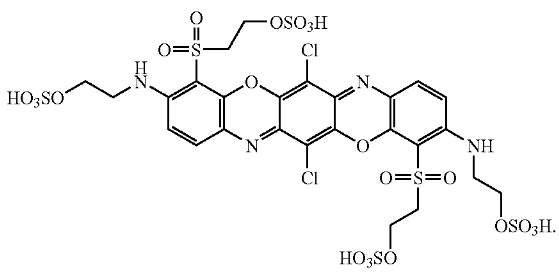

It is to be noted that all compounds may also be present in salt form. Useful salts include in particular alkali metal, alkaline earth metal or ammonium salts or the salts of an organic amine.

It is likewise to be noted that the alkyl groups can be linear or branched.

Preferred hydroxy-group-containing or nitrogen-containing organic substrates are leather and fibrous materials, which comprise natural or synthetic polyamides and, particularly, natural or regenerated cellulose such as, cotton, viscose and spun rayon. The most preferred substrates are textile materials comprising cotton.

Compounds of the formula (I) are prepared by reacting a diazotized compound of the formula (1)

(1)

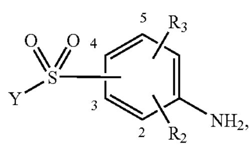

wherein all substituents have the meanings as defined above, with a compound of the formula (2)

(2)

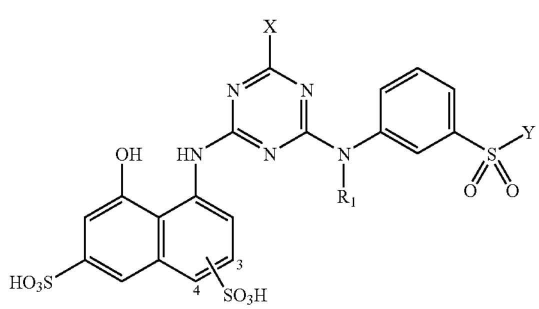

wherein all substituents have the meanings as defined above.

The process is preferably carried out in an aqueous medium at a temperature of from 0 to 40° C., more preferably 0 to 25° C. and at a pH of between 1 to 7, more preferably 1 to 6.

A dyestuff of formula (I) may be isolated in accordance with known methods, for example by salting out, filtering and drying optionally in vacuum and at slightly elevated temperature.

The yellow (or orange)-dyeing compounds are known from the state of the art and can therefore be produced according to the process given in the prior art. E.g. WO9963995, WO9963055 and F.Lehr, Dyes Pigm. (1990), 14(4), 257.

The blue-dyeing compounds are also known from the state of the art and can therefore be produced according to the process given in the prior art. E.g. EP 99721, EP84314, WO0168775, EP 149170, EP497174 and DE4241918.

This invention further provides dye mixtures for the trichromatic dyeing or printing of hydroxy-group-containing or nitrogen-containing organic substrates are used in the above processes according to the invention.

The inventive process for trichromatic dyeing or printing can be applied to all customary and known dyeing and printing processes, for example the continuous process, the exhaust process, the foam dyeing process and the ink-jet process.

The composition of the individual dye components in the trichromatic dye mixture used in the process according to the invention depends on the desired hue. For instance, a brown hue preferably utilizes 30-65% by weight of the yellow (or orange) component according to the invention, 10-30% by weight of the red component according to the invention and 10-30% by weight of the blue component according to the invention.

The red component, as described above, can consist of a single component or of a mixture of different red individual components.

The same applies to the yellow (or orange) and blue components.

The total amount of dyes in the process according to the invention is between 0.01 and 15% by weight, preferably between 1 and 10% by weight.

The present invention further provides hydroxy-group-containing or nitrogen-containing organic substrates dyed or printed by a dye mixture according to the invention.

The process according to the invention provides dyeings and prints having a homogeneous hue build-up throughout the entire hue spectrum with on-tone exhaustion, with a high bath exhaustion even in the case of fibres with low saturation and with a high dye build-up on fine fibres, particularly on microfibres.

The resulting dyeings or prints are notable for very high wet fastnesses, specifically the fastnesses in washing, perspiration and water. These good wet and fabrication fastnesses, which are in no way inferior to the fastness level of dyeings and prints with metal complexes, are obtained without aftertreatment. With an additional aftertreatment these fastnesses are even exceeded.

These excellent results are provided by metal-free elements which meet the current and future ecological requirements of national institutes and regulations.

The tables which follow show some examples of the individual components of the dye mixtures which are used in the inventive trichromatic dyeing process.

TABLE 1

Examples 1-18
Examples of red-dyeing compounds of formula (Ib) according to formula (I)

(Ib)

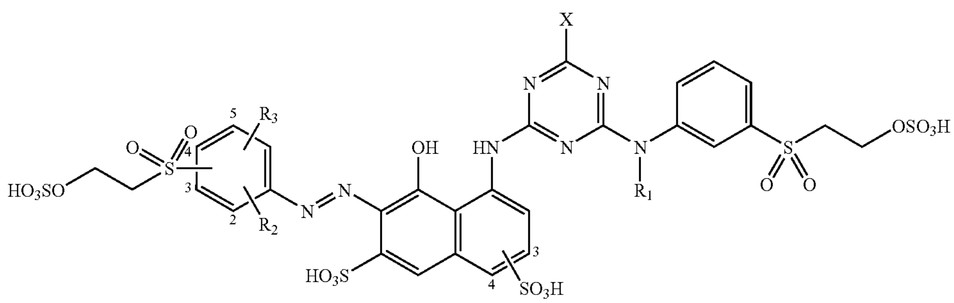

| Ex. | Position of —$O_2S$— | Position of —$SO_3H$ | $R_1$ | $R_2$ | $R_3$ | X |
|---|---|---|---|---|---|---|
| 1 | 3 | 4 | —$CH_2CH_3$ | H | H | Cl |
| 2 | 3 | 3 | —$CH_2CH_3$ | H | H | F |
| 3 | 4 | 3 | —$CH_2CH_3$ | H | H | F |
| 4 | 4 | 3 | —$CH_2CH_3$ | H | H | Cl |
| 5 | 4 | 4 | —$CH_2CH_3$ | H | H | Cl |
| 6 | 4 | 4 | —$CH_2CH_3$ | H | H | F |
| 7 | 4 | 3 | —$CH_3$ | H | H | F |
| 8 | 3 | 3 | —$CH_3$ | H | H | F |
| 9 | 5 | 3 | —$CH_2CH_3$ | (2)-$OCH_3$ | H | Cl |
| 10 | 4 | 3 | —$CH_2CH_3$ | (2)-$OCH_3$ | (5)-$CH_3$ | Cl |
| 11 | 4 | 3 | —$CH_3$ | (2)-$OCH_3$ | (5)-$OCH_3$ | F |
| 12 | 4 | 4 | —$CH_2CH_3$ | (2)-$OCH_3$ | (5)-$OCH_3$ | Cl |
| 13 | 4 | 4 | —$CH_2CH_3$ | (2)-$SO_3H$ | H | Cl |
| 14 | 5 | 3 | —$CH_3$ | (2)-$SO_3H$ | H | F |
| 15 | 5 | 3 | —$CH_2CH_3$ | (2)-$SO_3H$ | H | Cl |
| 16 | 4 | 3 | —$CH_2CH_3$ | (2)-$SO_3H$ | H | Cl |
| 17 | 4 | 3 | —$CH_2CH_3$ | (2)-$SO_3H$ | H | F |
| 18 | 3 | 3 | —$CH_2CH_3$ | (4)-$OCH_3$ | H | Cl |

TABLE 2

Examples 19-35
Examples of red-dyeing compounds of formula (Ic) according to formula (I)

(Ic)

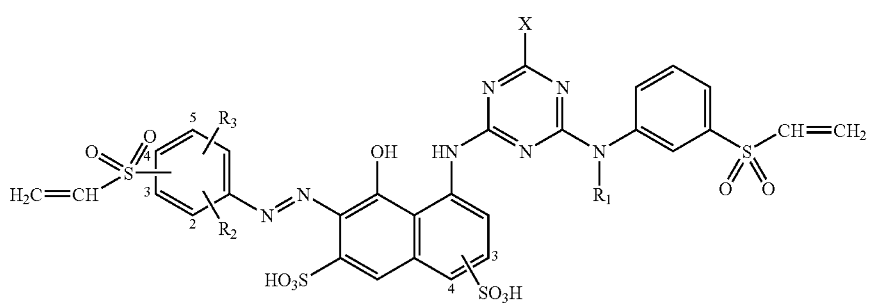

| Ex. | Position of —$O_2S$— | Position of —$SO_3H$ | $R_1$ | $R_2$ | $R_3$ | X |
|---|---|---|---|---|---|---|
| 19 | 3 | 4 | —$CH_2CH_3$ | H | H | Cl |
| 20 | 3 | 3 | —$CH_2CH_3$ | H | H | F |
| 21 | 4 | 3 | —$CH_2CH_3$ | H | H | F |
| 22 | 4 | 3 | —$CH_2CH_3$ | H | H | Cl |
| 23 | 4 | 4 | —$CH_2CH_3$ | H | H | Cl |
| 24 | 4 | 4 | —$CH_2CH_3$ | H | H | F |
| 25 | 4 | 3 | —$CH_3$ | H | H | F |
| 26 | 3 | 3 | —$CH_3$ | H | H | F |
| 27 | 5 | 3 | —$CH_2CH_3$ | (2)-$OCH_3$ | H | Cl |
| 28 | 4 | 3 | —$CH_2CH_3$ | (2)-$OCH_3$ | (5)-$CH_3$ | Cl |

TABLE 2-continued

Examples 19-35
Examples of red-dyeing compounds of formula (Ic) according to formula (I)

(Ic)

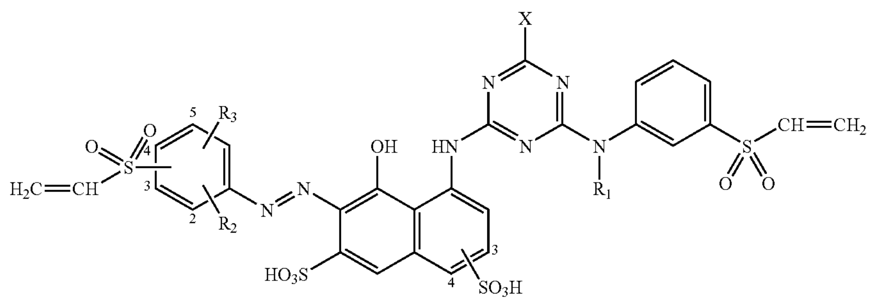

| Ex. | Position of —$O_2S$— | Position of —$SO_3H$ | $R_1$ | $R_2$ | $R_3$ | X |
|---|---|---|---|---|---|---|
| 29 | 4 | 3 | —$CH_3$ | (2)-$OCH_3$ | (5)-$OCH_3$ | F |
| 30 | 4 | 4 | —$CH_2CH_3$ | (2)-$OCH_3$ | (5)-$OCH_3$ | Cl |
| 31 | 4 | 4 | —$CH_2CH_3$ | (2)-$SO_3H$ | H | Cl |
| 32 | 5 | 3 | —$CH_3$ | (2)-$SO_3H$ | H | F |
| 33 | 5 | 3 | —$CH_2CH_3$ | (2)-$SO_3H$ | H | Cl |
| 34 | 4 | 3 | —$CH_2CH_3$ | (2)-$SO_3H$ | H | Cl |
| 35 | 4 | 3 | —$CH_2CH_3$ | (2)-$SO_3H$ | H | F |

TABLE 3

Examples 36-52
Examples of mixtures of red-dyeing compounds of formula (Ib), (Ic), (Id) and (Ie) according to formula (I)

(Ib)

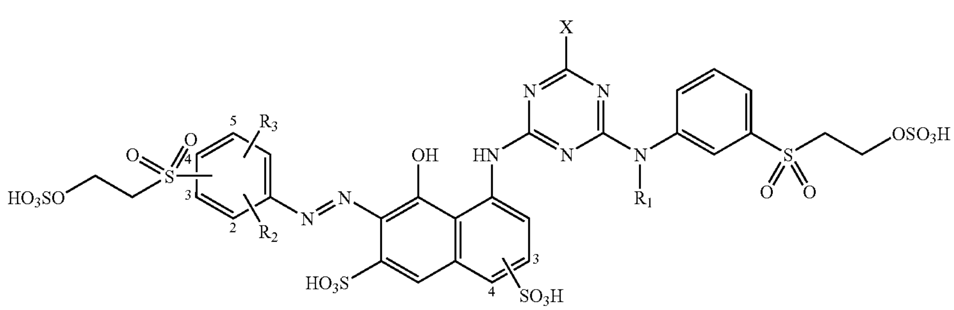

(Ic)

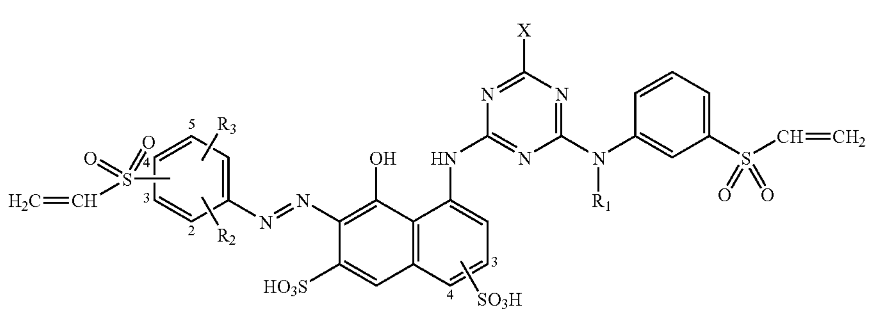

(Id)
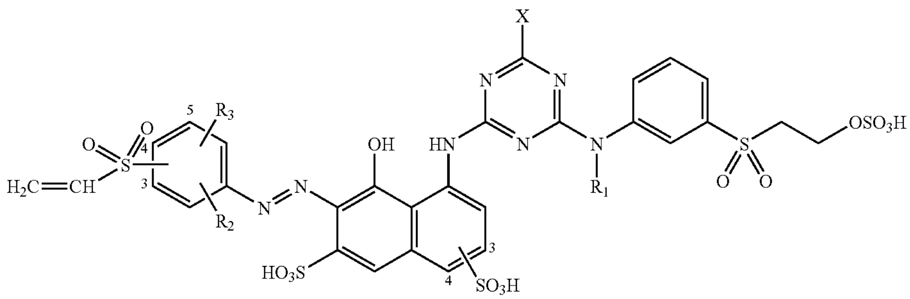
+
(Ie)
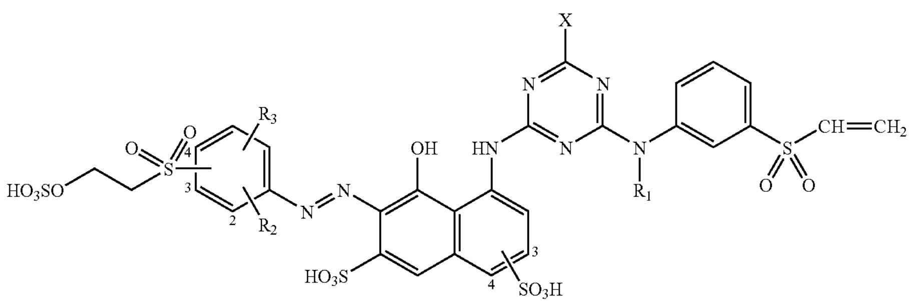
| Ex. | Position of —$O_2S$— | Position of —$SO_3H$ | $R_1$ | $R_2$ | $R_3$ | X |
|---|---|---|---|---|---|---|
| 36 | 3 | 4 | —$CH_2CH_3$ | H | H | Cl |
| 37 | 3 | 3 | —$CH_2CH_3$ | H | H | F |
| 38 | 4 | 3 | —$CH_2CH_3$ | H | H | F |
| 39 | 4 | 3 | —$CH_2CH_3$ | H | H | Cl |
| 40 | 4 | 4 | —$CH_2CH_3$ | H | H | Cl |
| 41 | 4 | 4 | —$CH_2CH_3$ | H | H | F |
| 42 | 4 | 3 | —$CH_3$ | H | H | F |
| 43 | 3 | 3 | —$CH_3$ | H | H | F |
| 44 | 5 | 3 | —$CH_2CH_3$ | (2)-$OCH_3$ | H | Cl |
| 45 | 4 | 3 | —$CH_2CH_3$ | (2)-$OCH_3$ | (5)-$CH_3$ | Cl |
| 46 | 4 | 3 | —$CH_3$ | (2)-$OCH_3$ | (5)-$OCH_3$ | F |
| 47 | 4 | 4 | —$CH_2CH_3$ | (2)-$OCH_3$ | (5)-$OCH_3$ | Cl |
| 48 | 4 | 4 | —$CH_2CH_3$ | (2)-$SO_3H$ | H | Cl |
| 49 | 5 | 3 | —$CH_3$ | (2)-$SO_3H$ | H | F |
| 50 | 5 | 3 | —$CH_2CH_3$ | (2)-$SO_3H$ | H | Cl |
| 51 | 4 | 3 | —$CH_2CH_3$ | (2)-$SO_3H$ | H | Cl |
| 52 | 4 | 3 | —$CH_2CH_3$ | (2)-$SO_3H$ | H | F |

TABLE 4
Examples 53-56
Examples of yellow (or orange)-dyeing compounds of formula (II') according to formula (II)
(II')
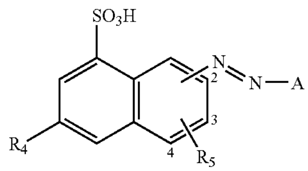
| Ex. | $R_4$ | $R_5$ | A | Position —N═N— |
|---|---|---|---|---|
| 53 | $SO_3H$ | (3)-$SO_3H$ | 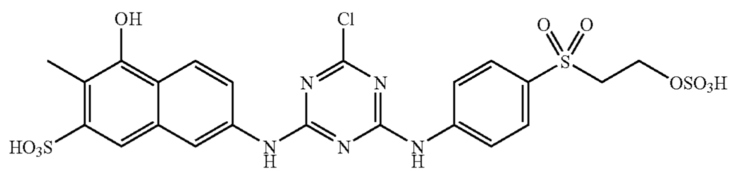 | 2 |
| 54 | $SO_3H$ | (3)-$SO_3H$ | 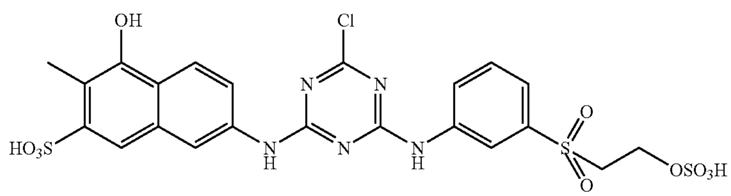 | 2 |
| 55 | H | (4)-$SO_3H$ | 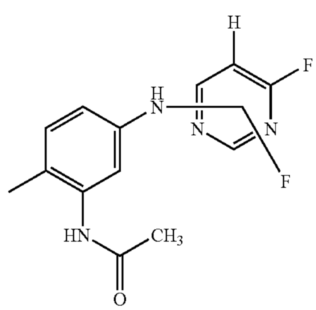 | 3 |
| 56 | $SO_3H$ | (3)-$SO_3H$ | 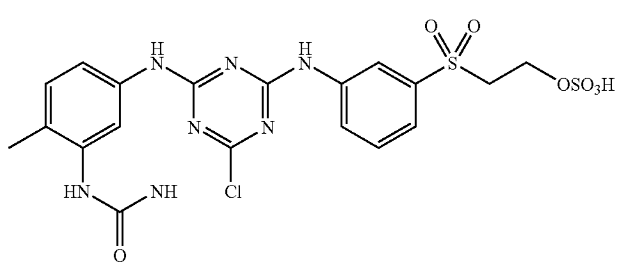 | 2 |

TABLE 5
Examples 57-59
Examples of orange-dyeing compounds of formula (III') according to formula (III)
(III')
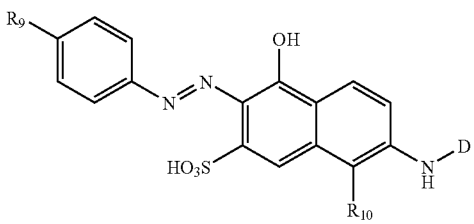
| Ex. | $R_9$ | $R_{10}$ | D |
|---|---|---|---|
| 57 | $—SO_3H$ | H | 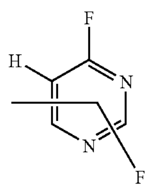 |
| 58 | $SO_2CH_2CH_2OSO_3H$ | $SO_3H$ | 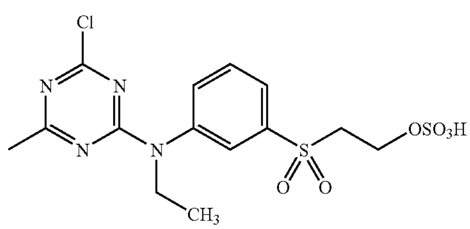 |
| 59 | $SO_2CH_2CH_2OSO_3H$ | $SO_3H$ | 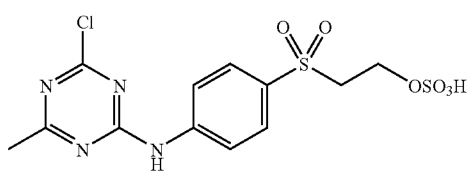 |

TABLE 6

Examples 60-62
Examples of yellow (or orange)-dyeing compounds of formula (IV') according to formula (IV)

(IV')

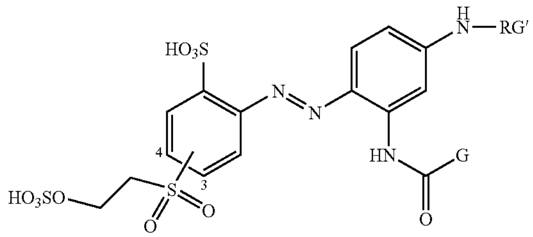

| Ex. | Position —$SO_2CH_2CH_2OSO_3H$ | G | RG' |
|---|---|---|---|
| 60 | 4 | —$NH_2$ | 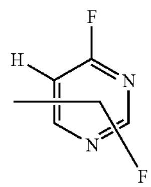 |
| 61 | 3 | —$CH_3$ | 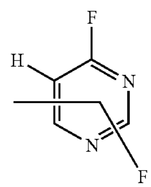 |

TABLE 6-continued

Examples 60-62
Examples of yellow (or orange)-dyeing compounds of formula (IV') according to formula (IV)

(IV')

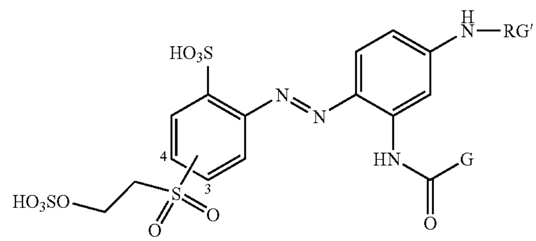

| Ex. | Position —$SO_2CH_2CH_2OSO_3H$ | G | RG' |
|---|---|---|---|
| 62 | 4 | —$CH_3$ | 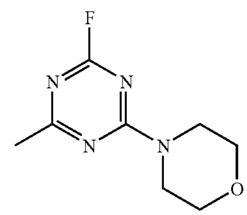 |

TABLE 7

Examples 63-72
Examples of blue-dyeing compounds of formula (V)

(V)

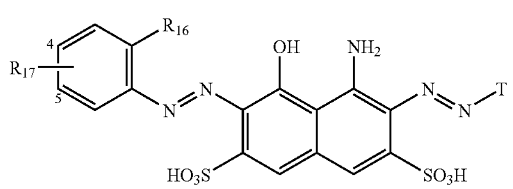

| Ex. | $R_{17}$ | $R_{16}$ | T |
|---|---|---|---|
| 63 | (4)-$SO_2CH_2CH_2OSO_3H$ | H | 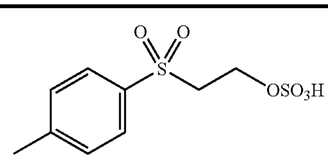 |
| 64 | (4)-$SO_2CH_2CH_2OSO_3H$ | H | 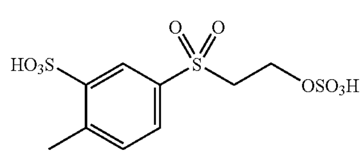 |

TABLE 7-continued
Examples 63-72
Examples of blue-dyeing compounds of formula (V)
(V)
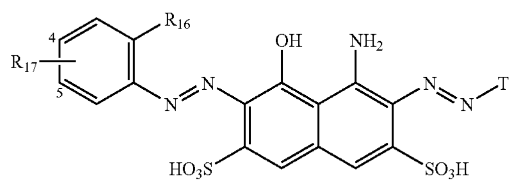
| Ex. | $R_{17}$ | $R_{16}$ | T |
|---|---|---|---|
| 65 | (5)-$SO_2CH_2CH_2OSO_3H$ | —$SO_3H$ | 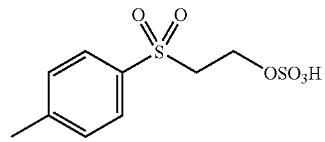 |
| 66 | 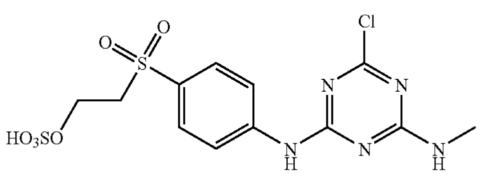 (5)- | —$SO_3H$ | 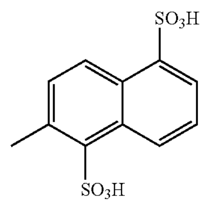 |
| 67 | 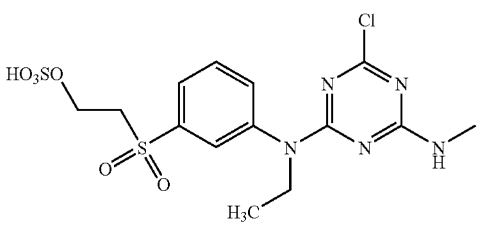 (5)- | —$SO_3H$ | 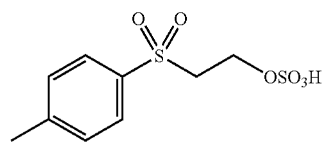 |
| 68 | 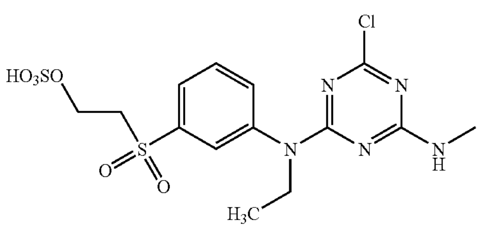 (5)- | —$SO_3H$ | 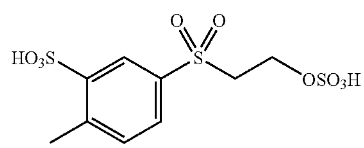 |
| 69 | 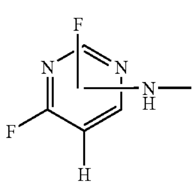 (5)- | —$SO_3H$ | 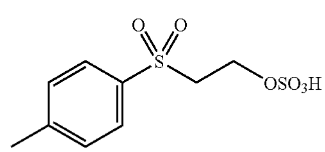 |
| 70 | 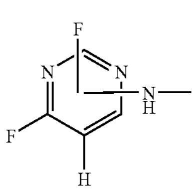 (5)- | —$SO_3H$ | 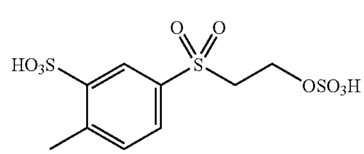 |

TABLE 7-continued

Examples 63-72

Examples of blue-dyeing compounds of formula (V)

(V)

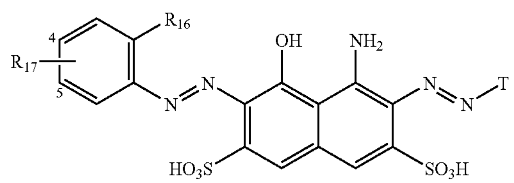

| Ex. | $R_{17}$ | $R_{16}$ | T |
|---|---|---|---|
| 71 | 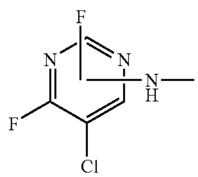 (5)- | —$SO_3H$ | 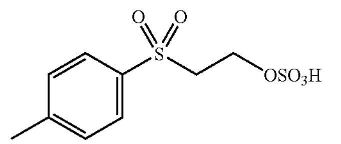 |
| 72 | 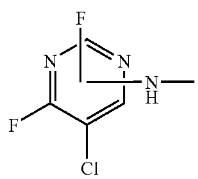 (5)- | -$SO_3H$ | 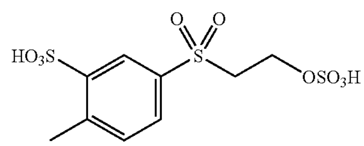 |

The application examples hereinbelow serve to illustrate the present invention. Parts are by weight and temperatures are in degrees Celsius, unless otherwise indicated.

APPLICATION EXAMPLE 1

A 20 g sample of bleached cotton knitting. is transferred in a solution of 16 g sodium sulfate in 200 ml water at 60° C.,

- 0.5% (calculated on the fabric weight) of a red dye as per Example 1
- 0.8% of a yellow dye as per Example 55
- 0.5% of a blue dye as per Formula VIa and portions of 0.3, 0.7 and 1 g of sodium carbonate are added at 60° C. after 30, 45 respectively 60 minutes. The temperature is maintained during another 60 minutes. The dyed fabric is rinsed in hot distilled water during 2 minutes and in hot tap water during 1 minute. After being kept in 1000 ml distilled water at the boil for 20 minutes. the fabric is dried. It provides a brown cotton dyeing having good fastnesses.

EXAMPLES 2-6

These examples are made analogous to Use Example 1, but by using dyestuff mixtures as mentioned below. The resulted shade is given in brackets.

APPLICATION EXAMPLE 2 (olive shade)

- 0.2% of a red dye as per Example 1
- 0.4% of a yellow dye as per Example 55
- 0.6% of a blue dye as per Formula VIa APPLICATION EXAMPLE 3 (brown shade)

- 0.3% of a red dye as per Example 39
- 0.9% of a orange dye as per Example 60
- 0.6% of a blue dye as per Formula Via APPLICATION EXAMPLE 4 (olive shade)

- 0.1% of a red dye as per Example 39
- 0.5% of a yellow dye as per Example 60
- 0.6% of a blue dye as per Formula VIa APPLICATION EXAMPLE 5 (brown shade)

- 0.5% of a red dye as per Example 2
- 0.9% of a yellow dye as per Example 55
- 0.3% of a blue dye as per Example 69

APPLICATION EXAMPLE 6 (olive shade)

- 0.2% of a red dye as per Example 2
- 0.4% of a yellow dye as per Example 55
- 0.3% of a blue dye as per Example 69.

The invention claimed is:

1. Trichromatic coloring process for coloring a hydroxy-group-containing or nitrogen-containing organic substrate comprising the step of coloring the substrate with a dye mixture comprising at least one red-dyeing compound of the formula (I)

(I)

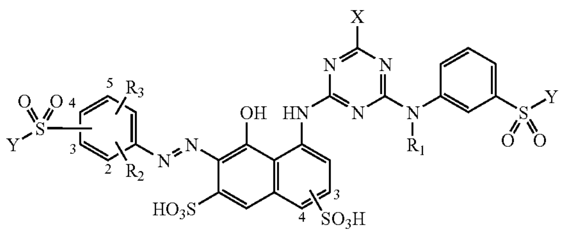

wherein $R_1$ is a $C_{1-4}$-alkyl group or a substituted $C_{2-4}$-alkyl group, $R_2$ and $R_3$ are independently from each other H; —OH; —CN; $C_{1-2}$-alkyl;

—$SO_3H$;

—COOH; —$OC_{1-2}$-alkyl or —$NH_2$,

X is a halogen radical and

Y —CH═$CH_2$ or —$CH_2CH_2$-Z, wherein Z is a radical which can be eliminated by alkali, at least one yellow or orange -dyeing compound is selected from the group consisting of: formula (II)

(II)

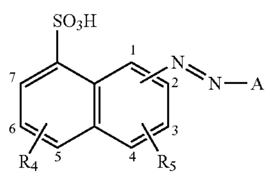

wherein $R_4$ and $R_5$ signify independently from each other H or —$SO_3H$,

A is a group of formula (i) or (ia)

(i)

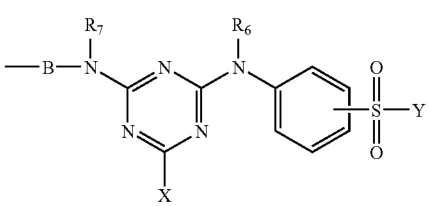

or (ia)

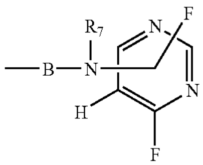

wherein

X and Y are defined above, $R_6$ and $R_7$ independently from each other H; unsubstituted $C_{1-4}$alkyl or substituted $C_{1-4}$alkyl, B is (ii)

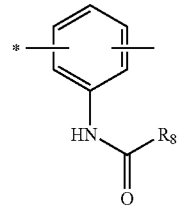

or (iii)

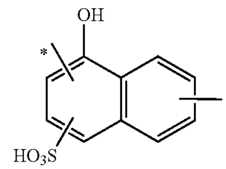

wherein $R_8$ $C_{1-4}$alkyl; —$NH_2$ or —$NHC_{1-4}$alkyl, wherein the asterisk marks the bond to the —N═N— group;

of formula (III)

(III)

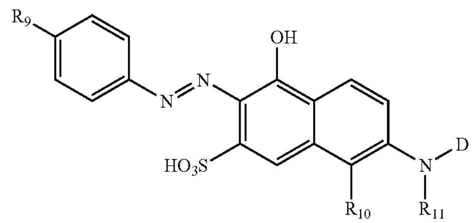

wherein $R_9$ —$SO_3H$ or —$SO_2Y$, wherein Y is defined above, $R_{10}$ H or —$SO_3H$, $R_{11}$ H; unsubstituted $C_{1-4}$alkyl or substituted $C_{1-4}$alkyl, D is (iv)

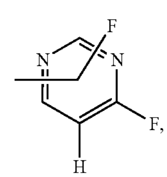

(iva)

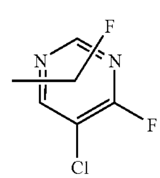

or (v)

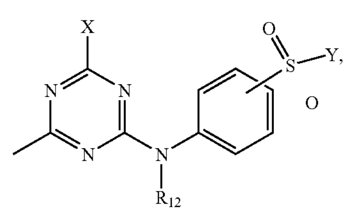

wherein

X and Y are defined above and $R_{12}$ is H; unsubstituted $C_{1-4}$alkyl or substituted $C_{1-4}$alkyl; and formula (IV)

(IV)

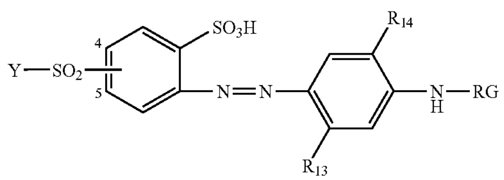

wherein $R_{13}$ is H; methyl; methoxy, ethoxy; —$NHCONH_2$ or —$NHCOCH_3$, $R_{14}$ is H; methyl; methoxy or ethoxy, RG is (vi)

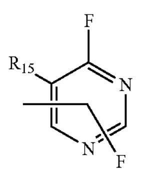

or (vii)

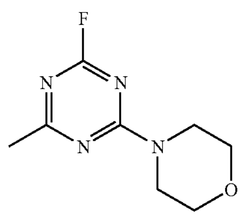

wherein $R_{15}$ is H or chlorine,

Y is defined above;

and at least one blue-dyeing compound selected from the group consisting of: formula (V)

(V)

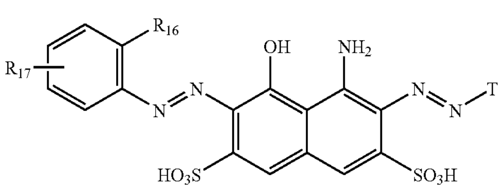

wherein $R_{16}$ is H or —$SO_3H$, $R_{17}$ is (viii)

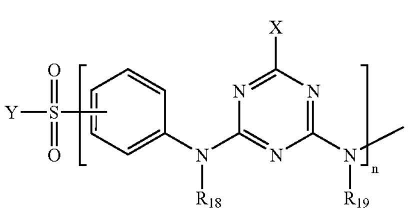

wherein

X and Y have the same meanings as defined above, $R_{18}$ and $R_{19}$ are independently from one another H; unsubstituted $C_{1-4}$alkyl or substituted $C_{1-4}$alkyl, n is 0 or 1, T is (ix)

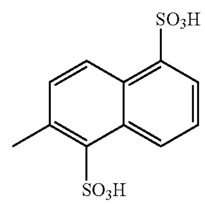

(x)

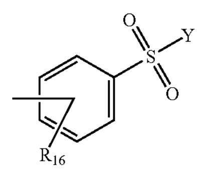

or (xi)

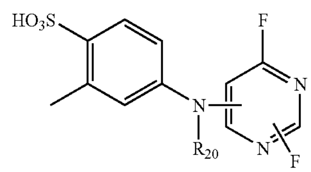

wherein $R_{16}$ has the meanings as defined above and Y has the meanings as defined above and $R_{20}$ is H; unsubstituted $C_{1-4}$alkyl or substituted $C_{1-4}$alkyl; formula (VI)

(VI)

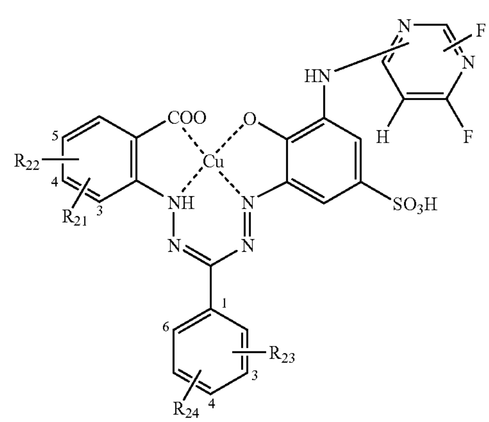

in which $R_{21}$ is H or —COOH, each of $R_{22}$ and $R_{24}$ is independently H; —COOH; —$SO_3H$; —$NHCOCH_3$; —$NHCOCHY_2$—$CH_2Y_1$; —$NHCOCY_2$=$CH_2$ or —$NHCOCH_2Y_1$, $R_{23}$—COOH, $Y_1$ is chlorine; bromine; —$OSO_3H$ or —$SSO_3H$ and $Y_2$ is H; chlorine or bromine;

formula (VII)

(VII)

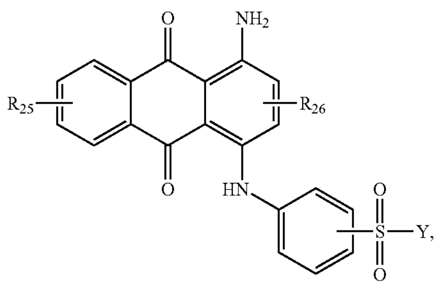

in which

Y has the same meanings as defined above, $R_{25}$ H or —$SO_3H$, $R_{26}$ H or —$SO_3H$;

and formula (VIII)

(VIII)

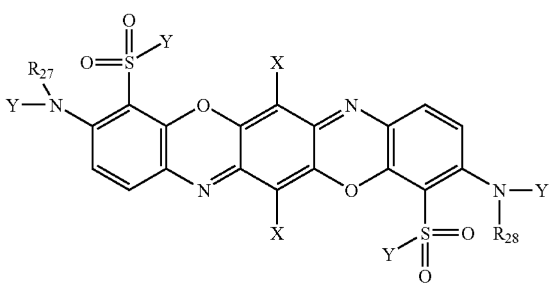

wherein each Y has independently from each other the same meaning as defined above, $R_{27}$ and $R_{28}$ are independently from each other H; unsubstituted $C_{1-4}$alkyl or substituted $C_{1-4}$alkyl.

2. Trichromatic coloring process according to claim 1, wherein the dye mixture comprises at least one red-dyeing compound of the formula (Ia)

(Ia)

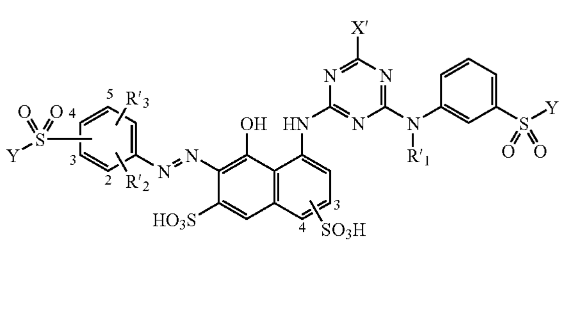

wherein

X' is Cl or F, $R'_1$ is a $C_{1-2}$-alkyl, especially —$C_2H_5$, or a $C_{2-4}$-alkyl group, which is monosubstituted by Cl, F, Br, —OH, —CN or —$NH_2$, $R'_2$ and $R'_3$ are independently from each other H; $C_{1-2}$-alkyl; —$SO_3H$ or —$OC_{1-2}$alkyl,; —$CH_3$; —$SO_3H$ or —$OCH_3$ and the —$SO_2Y$ group is attached to the phenylring at position 3, 4 or 5, wherein Y is as defined in claim 1.

3. Trichromatic coloring process according to claim 1, wherein the dye mixture comprises at least one yellow or orange -dyeing compound selected from the group consisting of formula (IIa), (IIb), (IIc)

(IIa)

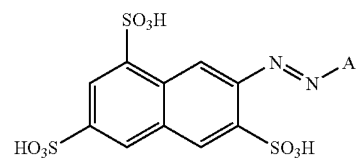

(IIb)

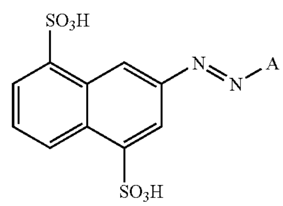

(IIc)

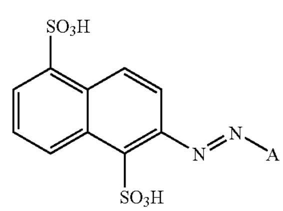

wherein A is $A_1$

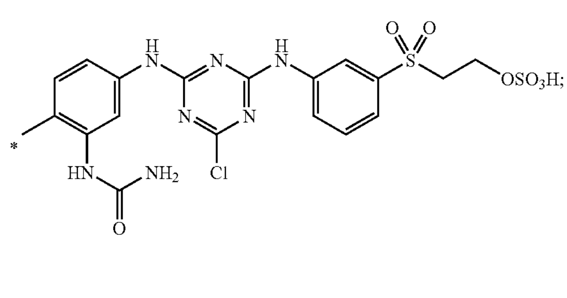

-continued
A2
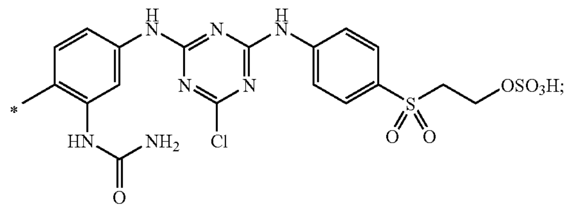
A3
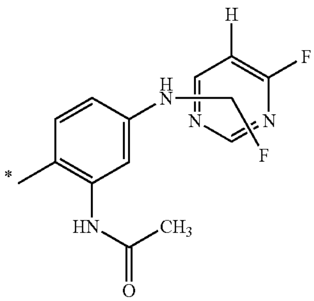
or
A4
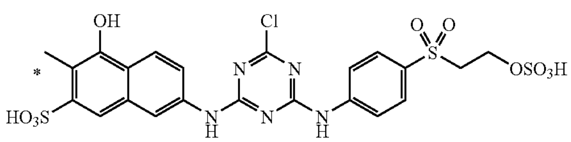
formula (IIIa), (IIIb)
(IIIa)
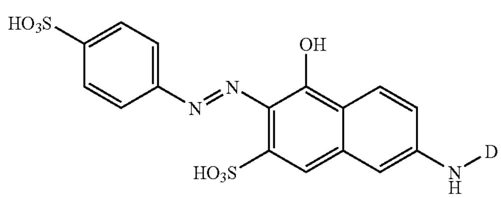
or
(IIIb)
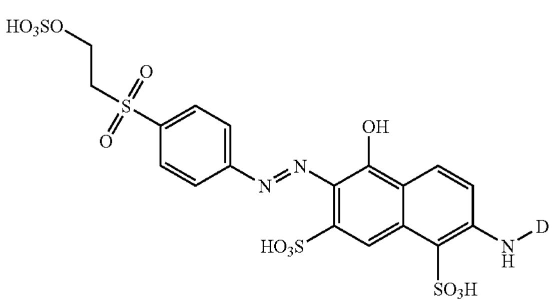
wherein D is
D1
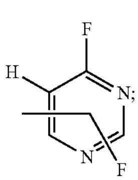
-continued
D2
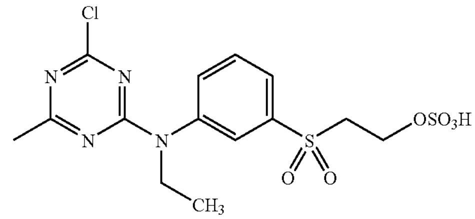
or
D3
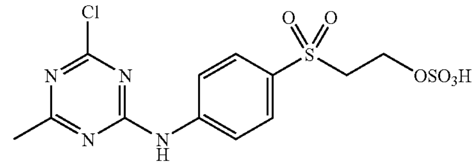
formula (IVa) and (IVb)
(IVa)
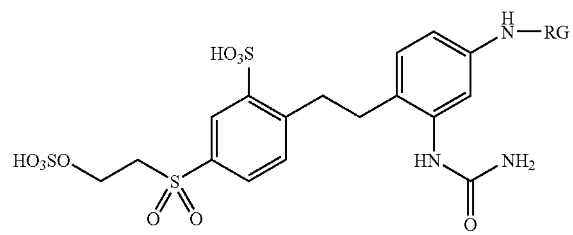
(IVb)
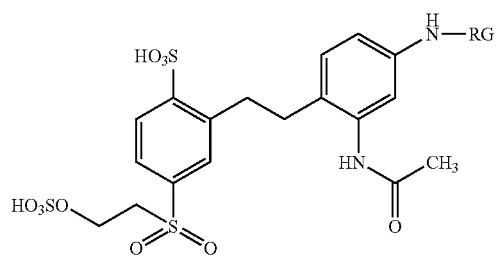
wherein RG is
RG1
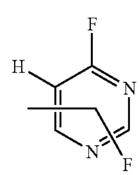
or
RG2
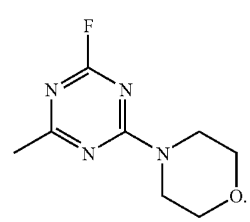
4. Trichromatic coloring process according to claim 1, wherein the dye mixture comprises at least one blue-dyeing compound selected from the group consisting of formula (Va), (Vb), (Vc), (Vd), (Ve) (Vf)

(Va)
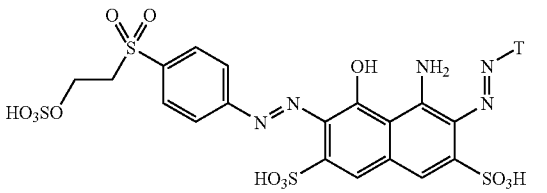
(Vb)
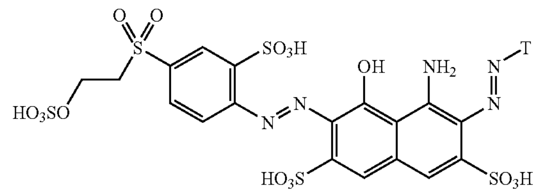
(Vc)
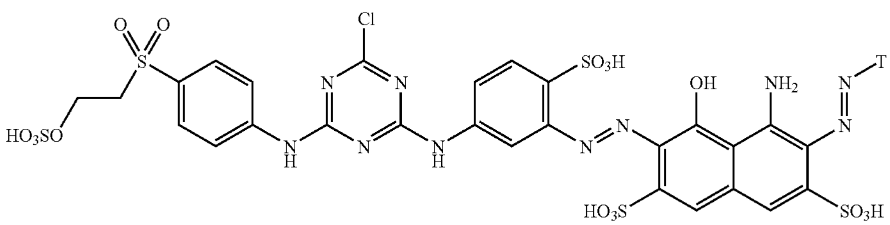
(Vd)
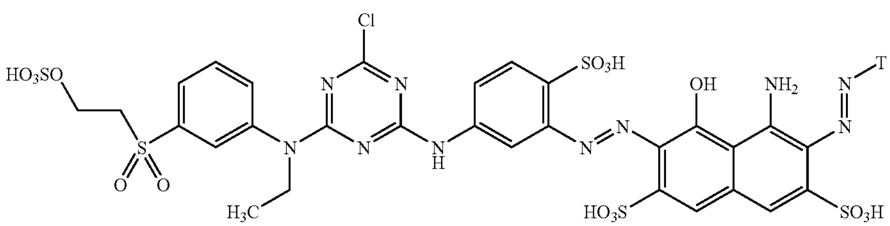
(Ve)
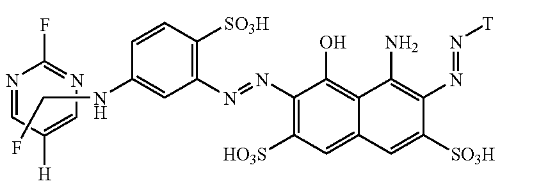
(Vf)
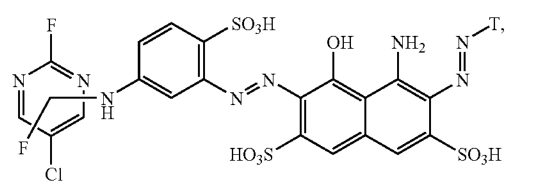
wherein T is
$T_1$
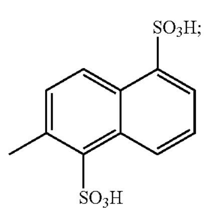
-continued
$T_2$
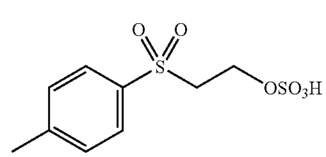
or -continued

T3

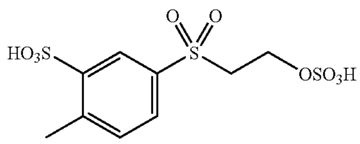

formula (VIa), (VIb)

(VIa)

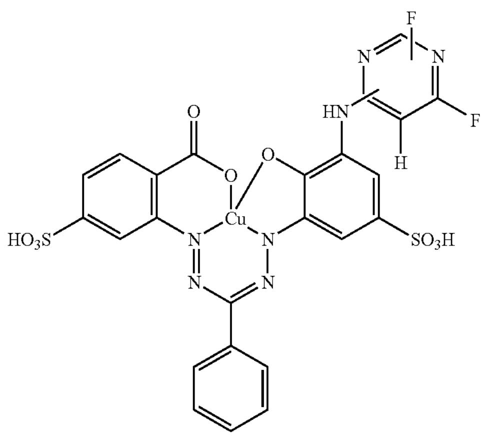

(VIb)

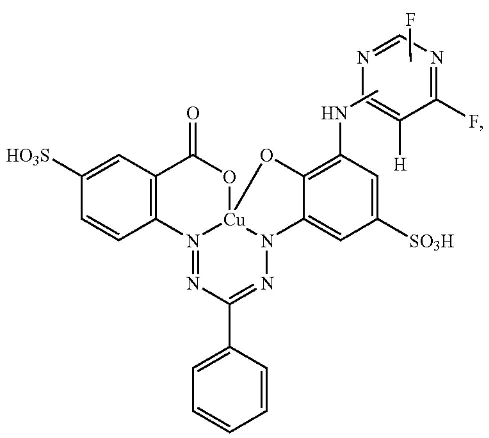

formula (VIIa), (VIIb)

(VIIa)

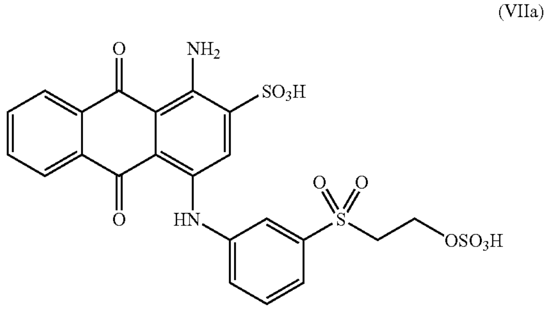

-continued (VIIb)

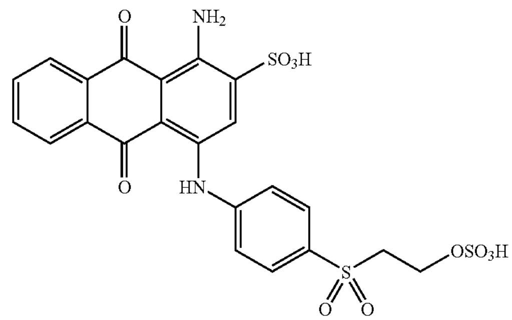

and formula (VIIIa)

(VIIIa)

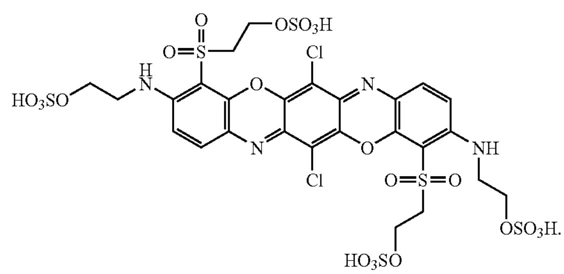

5. A hydroxy-group-containing or nitrogen-containing organic substrate colored by a trichromatic coloring process as claimed in claim 1.

6. Trichromatic coloring process according to claim 1, wherein the coloring step further comprises the step of dyeing or printing the substrate.

7. Trichromatic coloring process according to claim 1, wherein Y is bonded in a meta or para position with respect to the azo group.

8. A dye mixture comprising:

at least one red-dyeing compound of the formula (I)

(I)

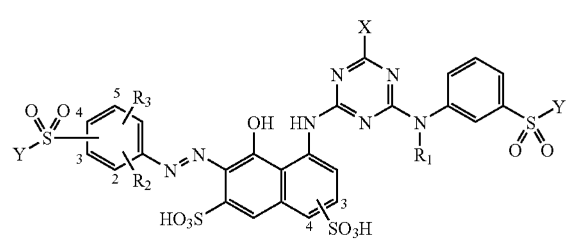

wherein $R_1$ is a $C_{1-4}$-alkyl group or a substituted $C_{2-4}$-alkyl group, $R_2$ and $R_3$ are independently from each other H; —OH; —CN; $C_{1-2}$-alkyl; —$SO_3H$; —COOH; —$OC_{1-2}$-alkyl or —$NH_2$, X is a halogen radical and Y is —CH═CH$_2$ or —CH$_2$CH$_2$-Z, wherein Z is a radical which is eliminated by alkali, at least one yellow or orange -dyeing compound is selected from the group consisting of: formula (II)

(II)

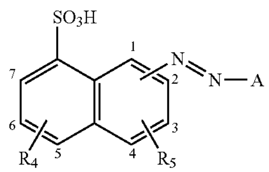

wherein

R$_4$ and R$_5$ signify independently from each other H or —SO$_3$H,

A signifies a group of formula (i) or (ia)

(i)

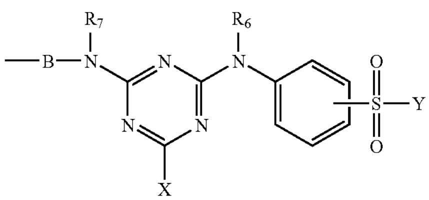

or (ia)

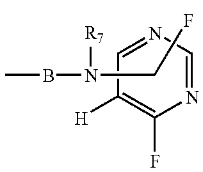

wherein

X and Y are defined above,

R$_6$ and R$_7$ signify independently from each other H; unsubstituted C$_{1-4}$alkyl or substituted C$_{1-4}$alkyl, B is (ii)

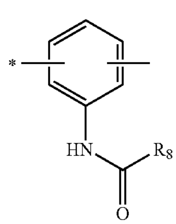

or (iii)

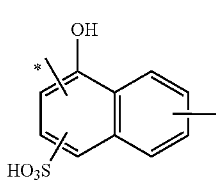

wherein R$_8$ C$_{1-4}$alkyl; —NH$_2$ or —NHC$_{1-4}$alkyl, and the asterisk marks the bond to the —N═N— group;

of formula (III)

(III)

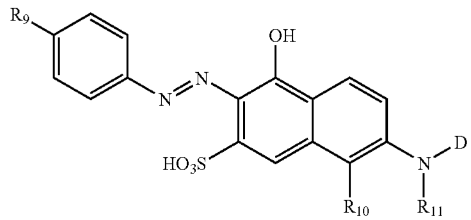

wherein

R$_9$ —SO$_3$H or —SO$_2$Y, wherein Y is defined above,

R$_{10}$ H or —SO$_3$H,

R$_{11}$ H; unsubstituted C$_{1-4}$alkyl or substituted C$_{1-4}$alkyl,

D is (iv)

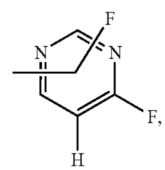

(iva)

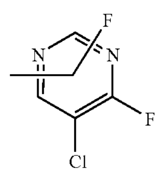

or (v)

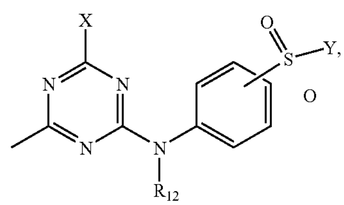

wherein

X and Y are defined above and

R$_{12}$ is H; unsubstituted C$_{1-4}$alkyl or substituted C$_{1-4}$alkyl;

and formula (IV)

(IV)

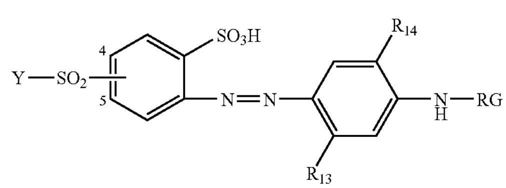

wherein

R$_{13}$ is H; methyl; methoxy, ethoxy; —NHCONH$_2$ or —NHCOCH$_3$,

R$_{14}$ is H; methyl; methoxy or ethoxy,

RG is (vi)

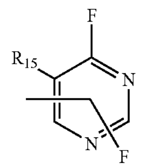

or (vii)

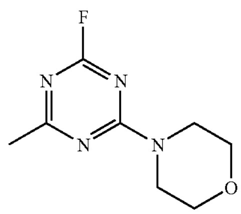

wherein $R_{15}$ is H or chlorine,

Y is defined above;

and at least one blue-dyeing compound selected from the group consisting of: formula (V)

(V)

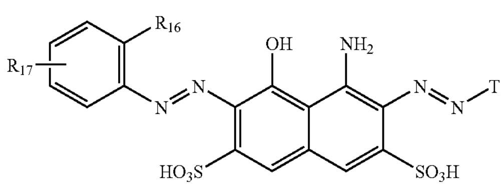

wherein $R_{16}$ is H or —$SO_3H$, $R_{17}$ is (viii)

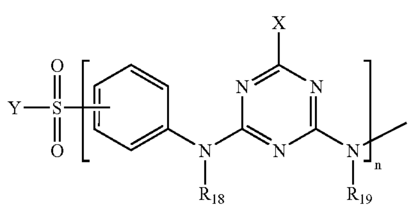

wherein

X and Y have the same meanings as defined in claim 1, $R_{18}$ and $R_{19}$ are independently from one another H; unsubstituted $C_{1-4}$alkyl or substituted $C_{1-4}$alkyl, n is 0 or 1, T is (ix)

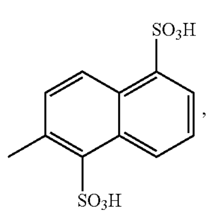

-continued (x)

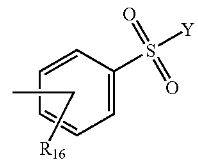

or (xi)

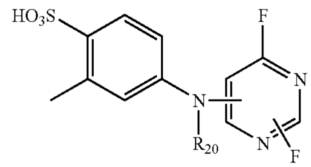

wherein $R_{16}$ has the meanings as defined above and Y has the meanings as defined in claim 1 and $R_{20}$ is H; unsubstituted $C_{1-4}$alkyl or substituted $C_{1-4}$alkyl;

formula (VI)

(VI)

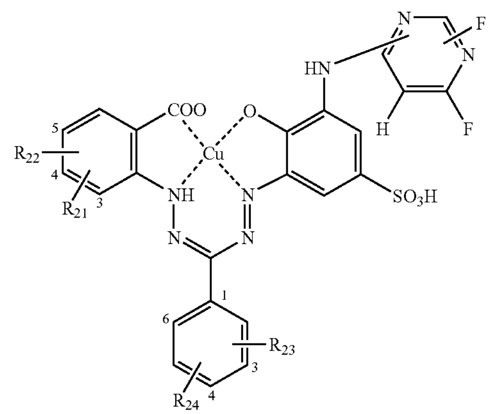

in which $R_{21}$ is H or —COOH, each of $R_{22}$ and $R_{24}$ is independently H; —COOH; —$SO_3H$; —$NHCOCH_3$; —$NHCOCHY_2$—$CH_2Y_1$; —$NHCOCY_2$═$CH_2$ or —$NHCOCH_2Y_1$, $R_{23}$—COOH, $Y_1$ is chlorine; bromine; —$OSO_3H$ or —$SSO_3H$ and $Y_2$ is H; chlorine or bromine;

formula (VII)

(VII)

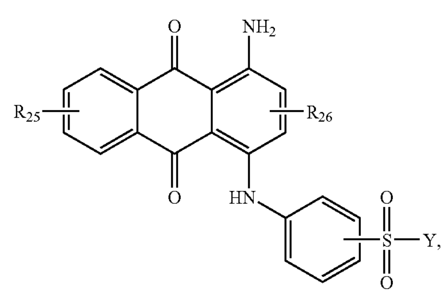

in which

Y has the same meanings as defined in claim 1, $R_{25}$ H or —$SO_3H$, $R_{26}$ H or —$SO_3H$;

and formula (VIII)

(VIII)

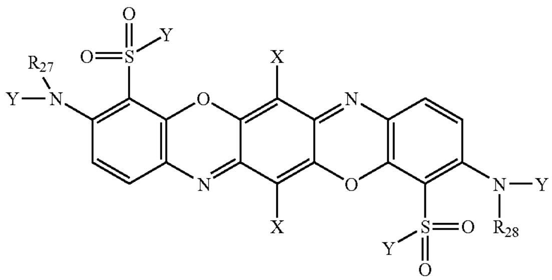

wherein each Y has independently from each other the same meaning as defined in claim 1

$R_{27}$ and $R_{28}$ are independently from each other H; unsubstituted $C_{1-4}$alkyl or substituted $C_{1-4}$alkyl.

9. Trichromatic coloring process for coloring a hydroxy-group-containing or nitrogen-containing organic substrate comprising the step of coloring the substrate with a dye mixture comprising at least one red-dyeing compound of the formula (I)

(I)

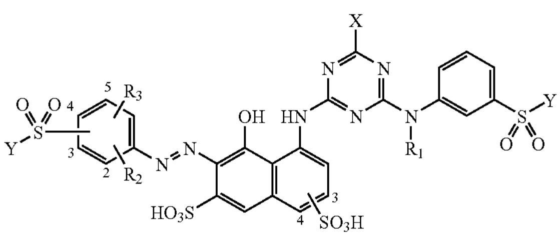

wherein $R_1$ is a $C_{1-4}$-alkyl group or a substituted $C_{2-4}$-alkyl group, $R_2$ and $R_3$ are independently from each other H; —OH; —CN; $C_{1-2}$-alkyl; —$SO_3H$; —COOH; —$OC_{1-2}$-alkyl or —$NH_2$, X is a halogen radical and Y —CH═$CH_2$ or —$CH_2CH_2$-Z, wherein Z is a radical which is eliminated by alkali;

at least one blue-dyeing compound is selected from the group consisting of: formula (V)

(V)

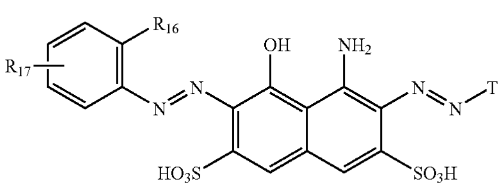

wherein $R_{16}$ is H or —$SO_3H$, $R_{17}$ is (viii)

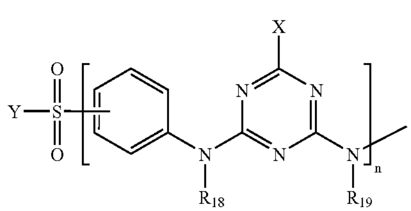

wherein

X and Y are defined above, $R_{18}$ and $R_{19}$ are independently from one another H; unsubstituted $C_{1-4}$alkyl or substituted $C_{1-4}$alkyl, n is 0 or 1, T is (ix)

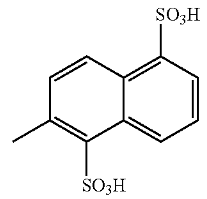

(x)

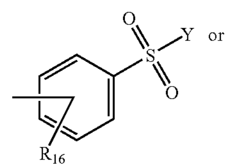

(xi)

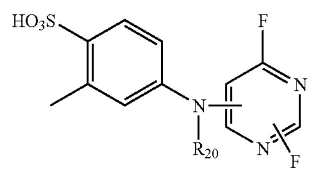

wherein $R_{16}$ has the meanings as defined above and Y is defined above and $R_{20}$ is H; unsubstituted $C_{1-4}$alkyl or substituted $C_{1-4}$alkyl;

formula (VI)

(VI)

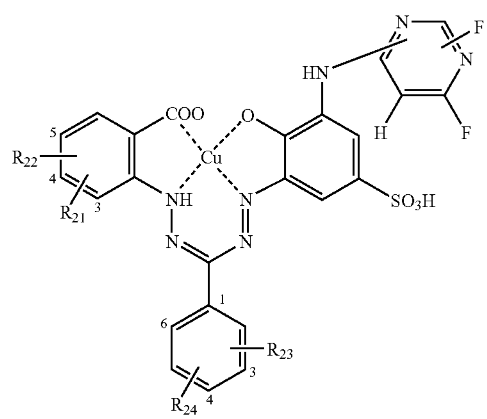

in which $R_{21}$ is H or —COOH, each of $R_{22}$ and $R_{24}$ is independently H; —COOH; —$SO_3H$; —$NHCOCH_3$; —$NHCOCHY_2$—$CH_2Y_1$; —$NHCOCY_2$═$CH_2$ or —$NHCOCH_2Y_1$, $R_{23}$—COOH, $Y_1$ is chlorine; bromine; —$OSO_3H$ or —$SSO_3H$ and $Y_2$ is H; chlorine or bromine;

formula (VII)

(VII)

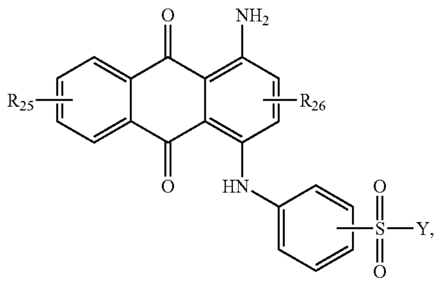

in which

Y is defined above, $R_{25}$ H or —$SO_3H$, $R_{26}$ H or —$SO_3H$;

and formula (VIII)

(VIII)

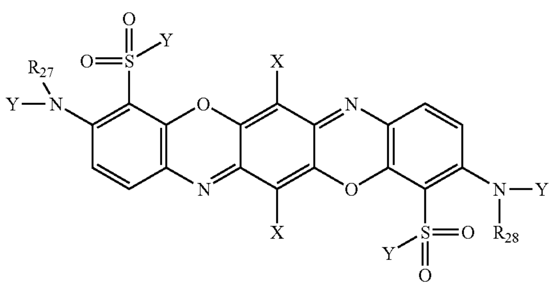

wherein each Y is independently from each other defined above, $R_{27}$ and $R_{28}$ are independently from each other H; unsubstituted $C_{1-4}$alkyl or substituted $C_{1-4}$alkyl;

and at least on yellow or orange -dyeing compound.

10. Trichromatic coloring process according to claim 9, wherein the dye mixture comprises at least one yellow or orange -dyeing compound selected from the group consisting of: formula (IIa), (IIb), (IIc)

(IIa)

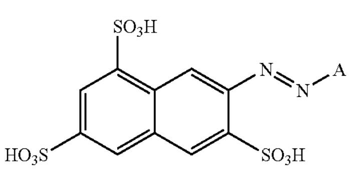

(IIb)

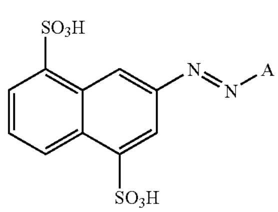

-continued (IIc)

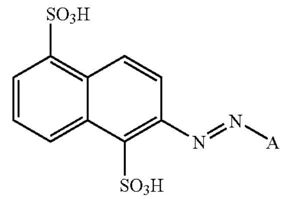

wherein A is $A_1$

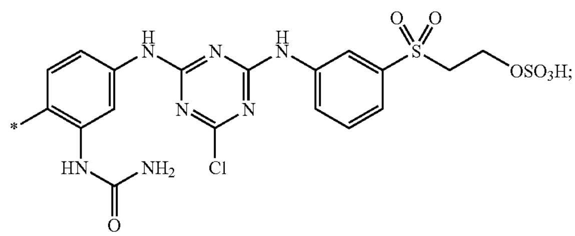

$A_2$

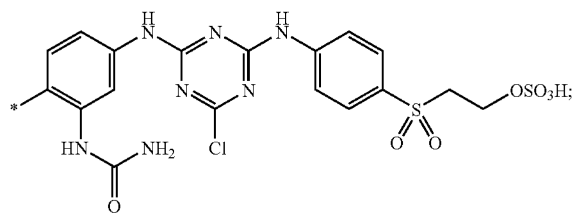

$A_3$

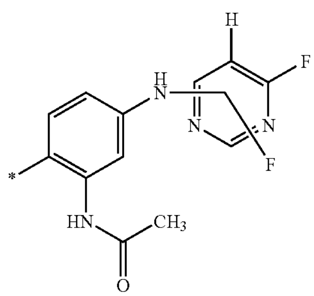

or $A_4$

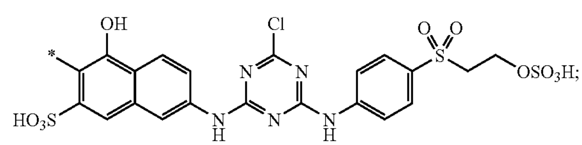

formula (IIIa), (IIIb), (IIIa)

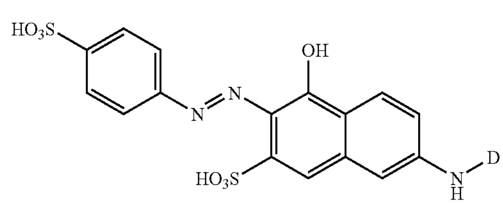

or

-continued (IIIb)

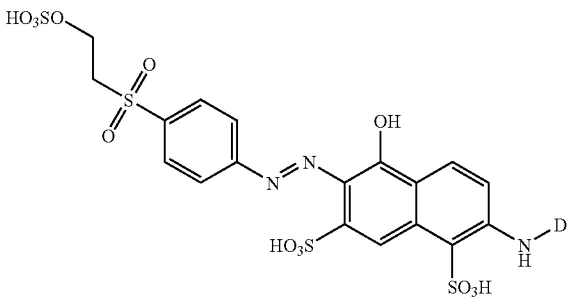

wherein D is $D_1$

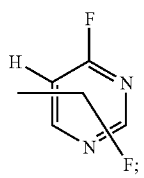

$D_2$

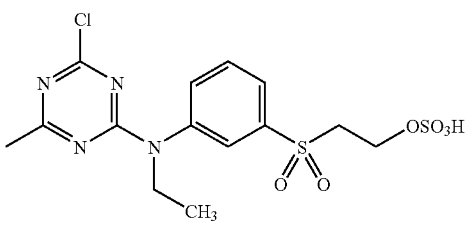

or $D_3$

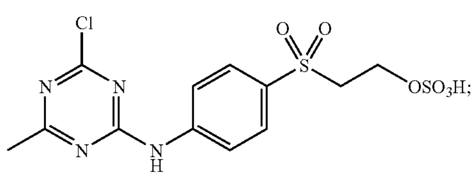

and formula (IVa) and (IVb), (IVa)

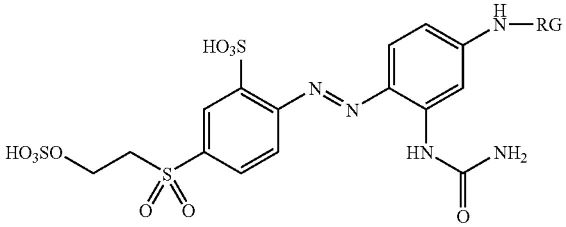

-continued (IVb)

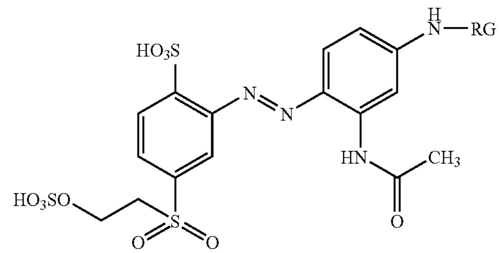

wherein RG is $RG_1$

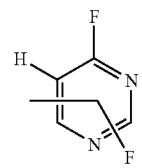

or $RG_2$

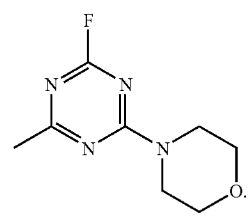

11. Trichromatic coloring process according to claim 1, wherein the coloring step further comprises the step of dyeing or printing the substrate.

12. A dye mixture comprising:

at least one red-dyeing compound of the formula (I)

(I)

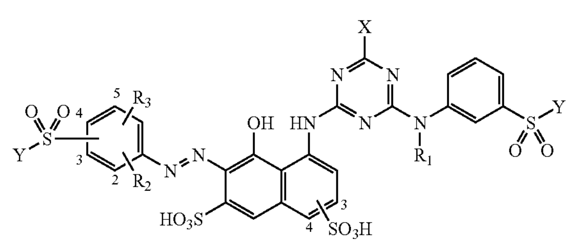

wherein $R_1$ is a $C_{1-4}$-alkyl group or a substituted $C_{2-4}$-alkyl group, $R_2$ and $R_3$ are independently from each other H; —OH; —CN; $C_{1-2}$-alkyl; —$SO_3H$; —COOH; —$OC_{1-2}$-alkyl or —$NH_2$, X is a halogen radical and Y —CH═CH$_2$ or —CH$_2$CH$_2$-Z, wherein Z is a radical which is eliminated by alkali, at least one yellow or orange -dyeing compound, and at least one blue-dyeing compound selected from the group consisting of: formula (V)

(V)

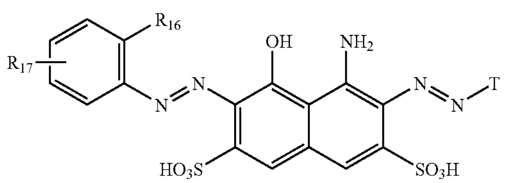

wherein $R_{16}$ is H or —SO$_3$H, $R_{17}$ is (viii)

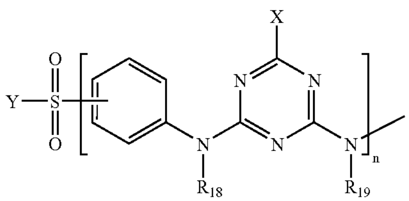

wherein

X and Y are defined above, $R_{18}$ and $R_{19}$ are independently from one another H; unsubstituted $C_{1-4}$alkyl or substituted $C_{1-4}$alkyl, n is 0 or 1, T is (ix)

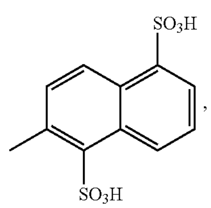

(x)

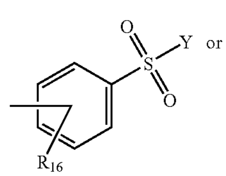

(xi)

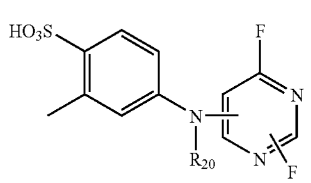

wherein $R_{16}$ has the meanings as defined above and Y is defined above, and $R_{20}$ is H; unsubstituted $C_{1-4}$alkyl or substituted $C_{1-4}$alkyl; formula (VI)

(VI)

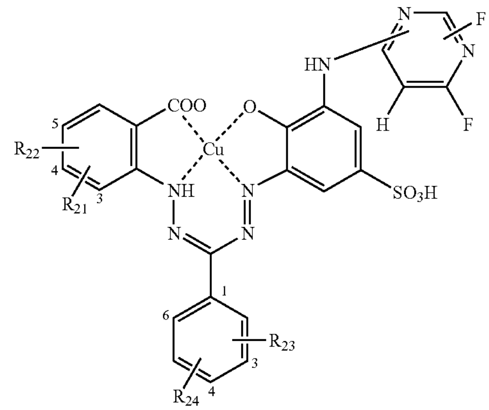

wherein $R_{21}$ is H or —COOH, each of $R_{22}$ and $R_{24}$ is independently H; —COOH; —SO$_3$H; —NHCOCH$_3$; —NHCOCHY$_2$—CH$_2$Y$_1$; —NHCOCY$_2$═CH$_2$ or —NHCOCH$_2$Y$_1$, $R_{23}$—COOH, $Y_1$ is chlorine; bromine; —OSO$_3$H or —SSO$_3$H and $Y_2$ is H; chlorine or bromine;

formula (VII)

(VII)

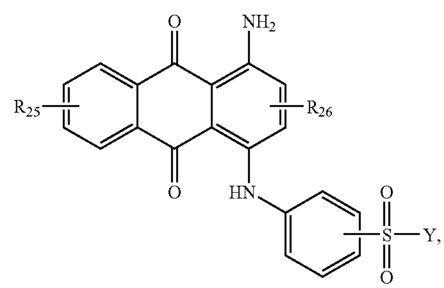

in which

Y is defined above, $R_{25}$ H or —SO$_3$H, $R_{26}$ H or —SO$_3$H;

and formula (VIII)

(VIII)

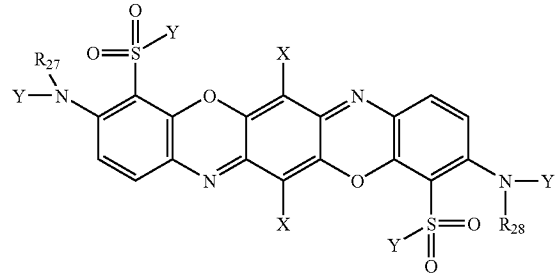

wherein each Y has independently from each other the same meaning as defined above $R_{27}$ and $R_{28}$ are independently from each other H; unsubstituted $C_{1-4}$alkyl or substituted $C_{1-4}$alkyl.

13. Trichromatic coloring process according to claim 2, wherein the dye mixture comprises at least one yellow or orange -dyeing compound selected from the group consisting of formula (IIa), (IIb), (IIc)

(IIa)

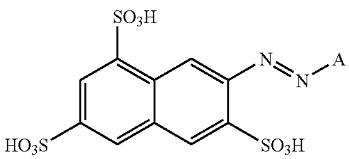

(IIb)

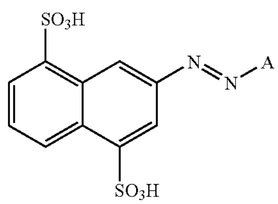

(IIc)

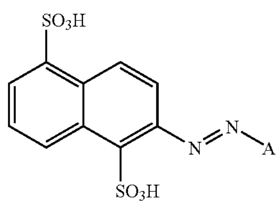

wherein A is $A_1$

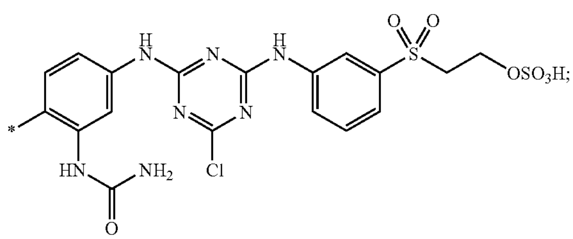

$A_2$

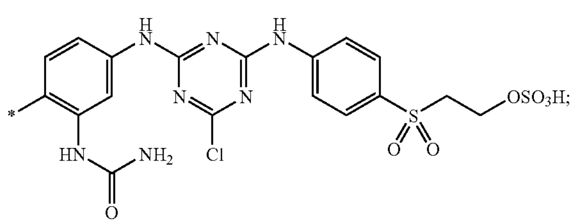

$A_3$

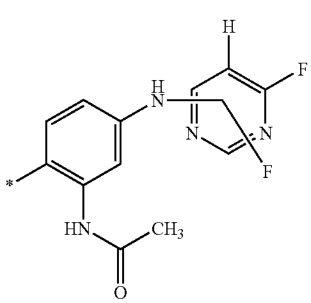

or

-continued $A_4$

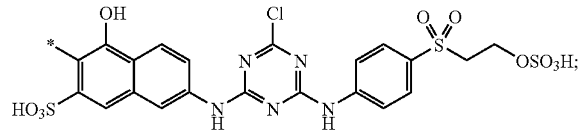

formula (IIIa), (IIIb), (IIIa)

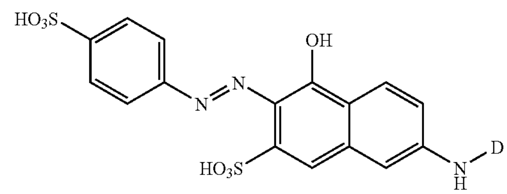

or (IIIb)

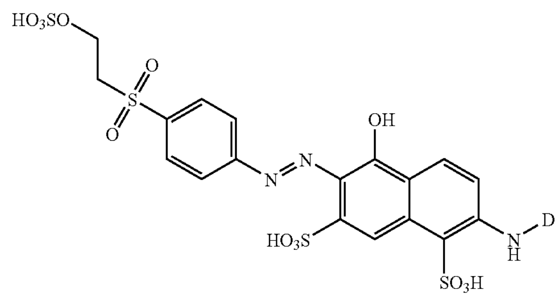

wherein D is $D_1$

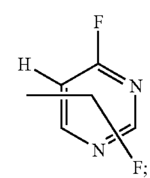

$D_2$

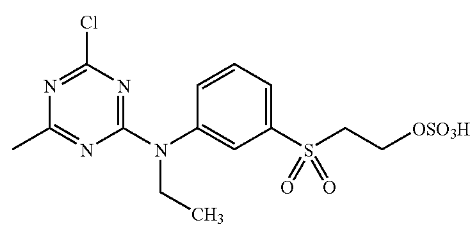

or $D_3$

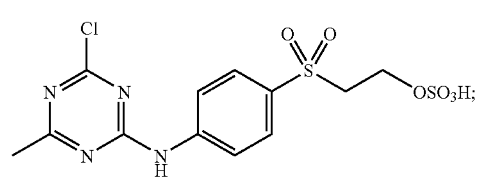

and formula (IVa) and (IVb),
(IVa)
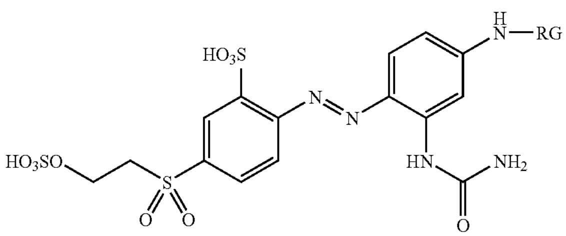
(IVb)
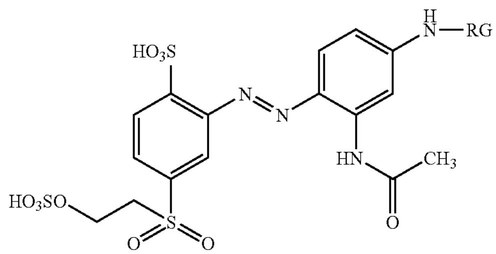
wherein RG is
RG$_1$
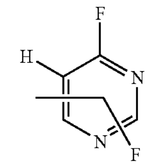
or
RG$_2$
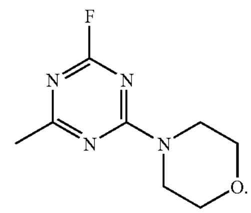
14. Trichromatic coloring process according to claim 13, wherein the dye mixture comprises at Least one blue-dyeing compound selected from the group consisting of: formula (Va). (Vb), (Vc), (Vd), (Ve), (Vf)
(Va)
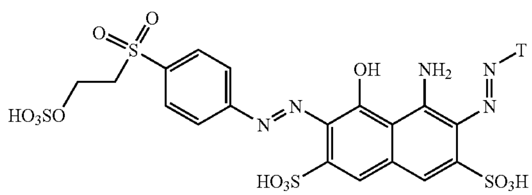
(Vb)
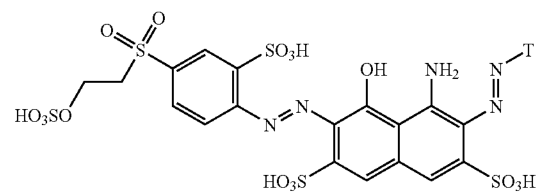
(Vc)
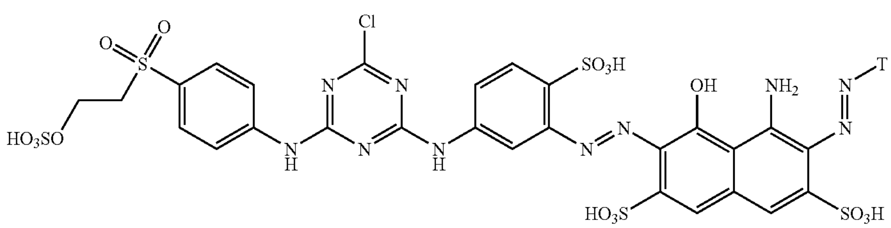
(Vd)
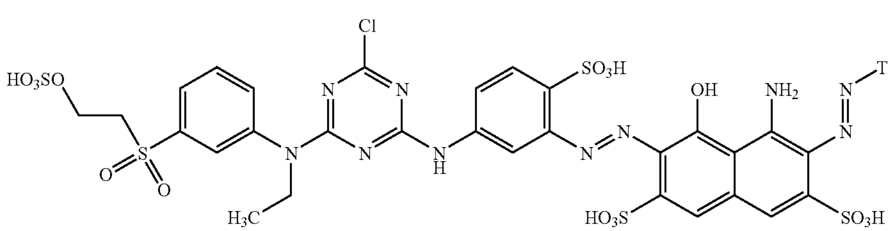
(Ve)
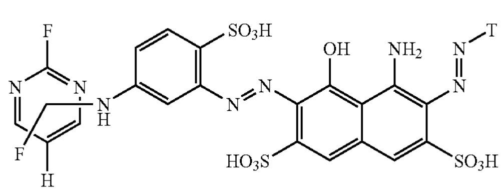
(Vf)
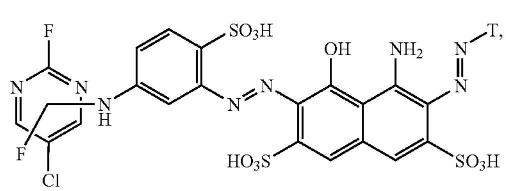

wherein T is
T1
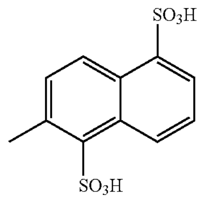
;
T2
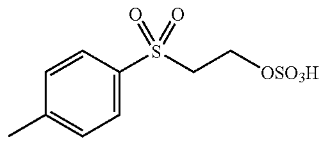
or
T3
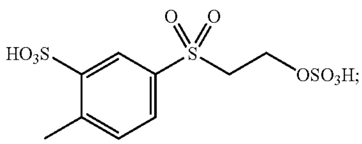
formula (VIa), (VIb),
(VIa)
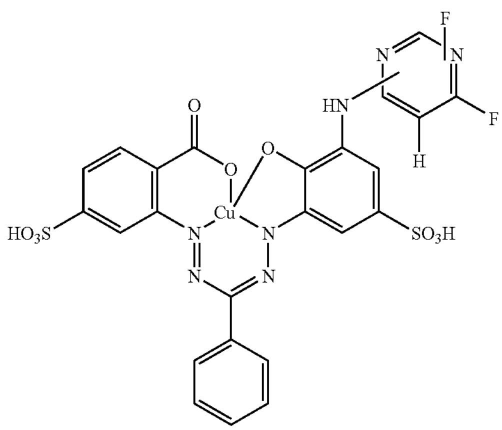
(VIb)
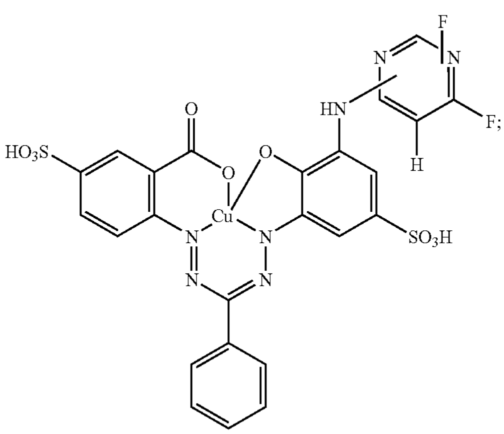
formula (VIIa), (VIIb),
(VIIa)
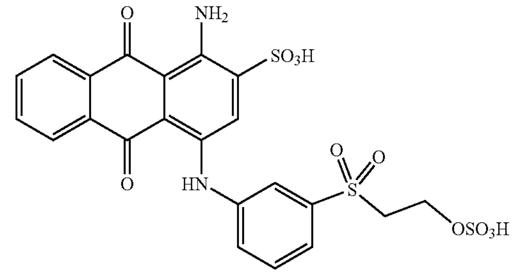
(VIIb)
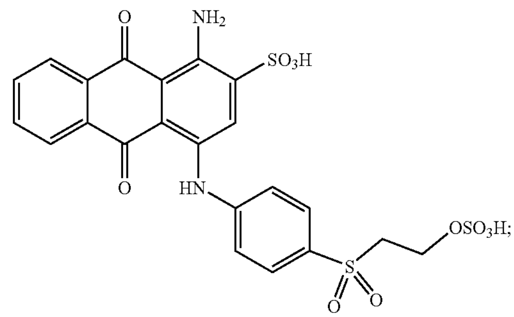
and formula (VIIIa)
(VIIIa)
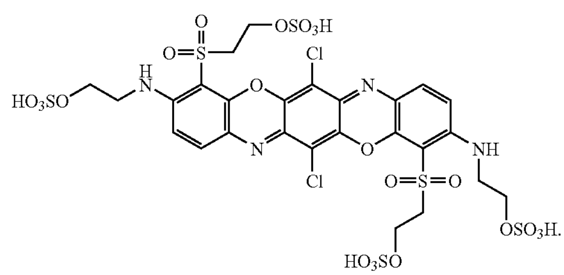
15. A dye mixture comprising:
at least one red-dyeing compound of the formula (I)
(I)
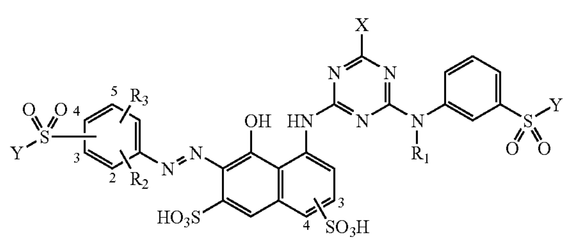
wherein
$R_1$ is a $C_{1-4}$-alkyl group or a substituted $C_{2-4}$-alkyl group,
$R_2$ and $R_3$ are independently from each other H; —OH; —CN; $C_{1-2}$-alkyl; —$SO_3H$; —COOH; —$OC_{1-2}$-alkyl or —$NH_2$, X is a halogen radical and Y —CH═CH$_2$ or —CH$_2$CH$_2$-Z, wherein Z is a radical which is eliminated by alkali;

at least one blue-dyeing compound selected from the group consisting of: formula (V)

(V)

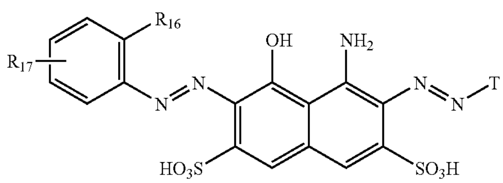

wherein $R_{16}$ is H or —SO$_3$H, $R_{17}$ is (viii)

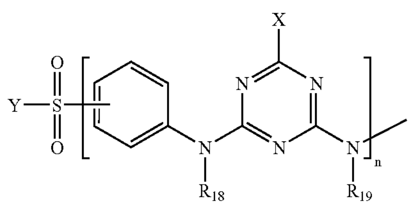

wherein

X and Y are defined above, $R_{18}$ and $R_{19}$ are independently from one another H; unsubstituted $C_{1-4}$alkyl or substituted $C_{1-4}$alkyl, n is 0 or 1, T is (ix)

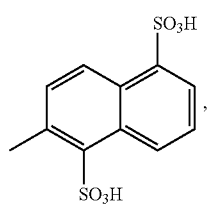

(x)

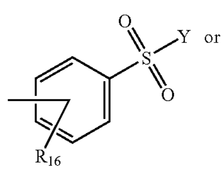

(xi)

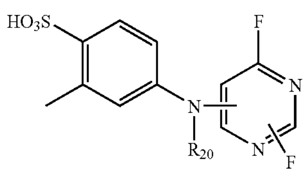

wherein $R_{16}$ has the meanings as defined above and Y is defined above, and $R_{20}$ is H; unsubstituted $C_{1-4}$alkyl or substituted $C_{1-4}$alkyl; formula (VI)

(VI)

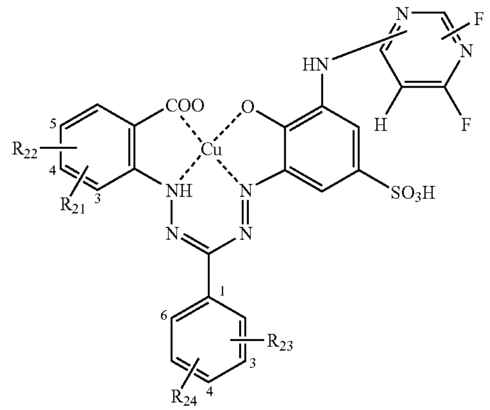

in which $R_{21}$ is H or —COOH, each of $R_{22}$ and $R_{24}$ is independently H; —COOH; —SO$_3$H; —NHCOCH$_3$; —NHCOCHY$_2$—CH$_2$Y$_1$; —NHCOCY$_2$═CH$_2$ or —NHCOCH$_2$Y$_1$, $R_{23}$—COOH, $Y_1$ is chlorine; bromine; —OSO$_3$H or —SSO$_3$H and $Y_2$ is H; chlorine or bromine;

formula (VII)

(VII)

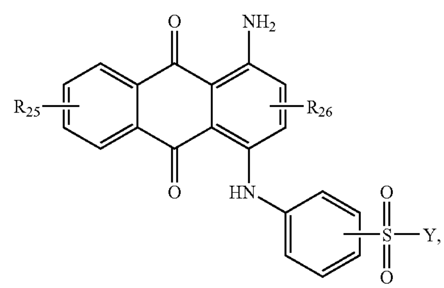

in which

Y is defined above, $R_{25}$ H or —SO$_3$H, $R_{26}$ H or —SO$_3$H;

and formula (VIII)

(VIII)

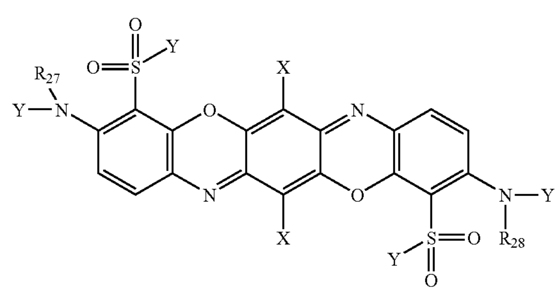

wherein each Y has independently from each other the same meaning as defined above $R_{27}$ and $R_{28}$ are independently from each other H; unsubstituted $C_{1-4}$alkyl or substituted $C_{1-4}$alkyl;

and at least one yellow or orange-dyeing compound is selected from the group consisting of: formula (II)

(II)

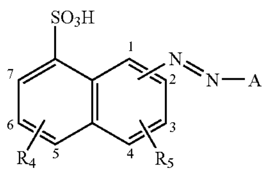

wherein $R_4$ and $R_5$ signify independently from each other H or —$SO_3H$,

A is a group of formula (i) or (ia)

(i)

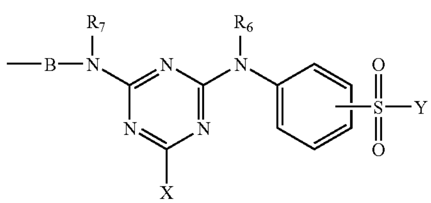

or (ia)

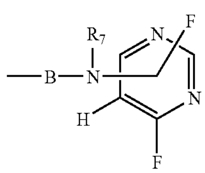

wherein

X and Y are defined above, $R_6$ and $R_7$ signify independently from each other H; unsubstituted $C_{1-4}$alkyl or substituted $C_{1-4}$alkyl, B is (ii)

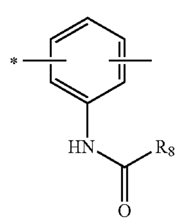

or (iii)

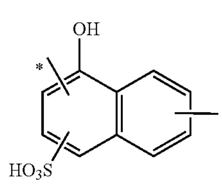

wherein $R_8$ $C_{1-4}$alkyl; —$NH_2$ or —$NHC_{1-4}$alkyl, and the asterisk marks the bond to the —N═N— group; formula (III)

(III)

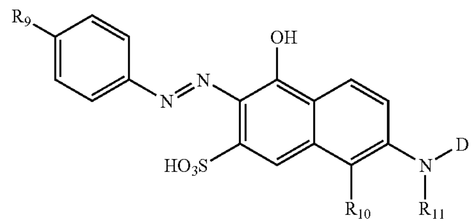

wherein $R_9$ —$SO_3H$ or —$SO_2Y$, wherein Y has the same definition as defined in claim 1, $R_{10}$ H or —$SO_3H$, $R_{11}$ H; unsubstituted $C_{1-4}$alkyl or substituted $C_{1-4}$alkyl, D is (iv)

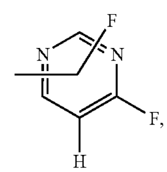

(iva)

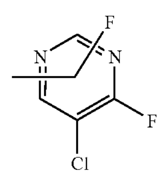

or (v)

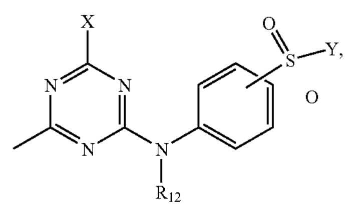

wherein

X and Y are defined above and $R_{12}$ is H; unsubstituted $C_{1-4}$alkyl or substituted $C_{1-4}$alkyl; and formula (IV)

(IV)

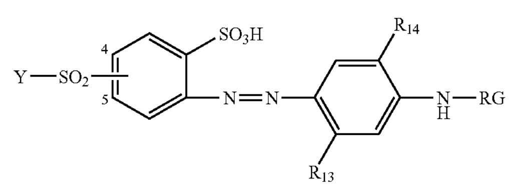

wherein
$R_{13}$ is H; methyl; methoxy, ethoxy; —NHCONH$_2$ or —NHCOCH$_3$,
$R_{14}$ is H; methyl; methoxy or ethoxy,
RG is
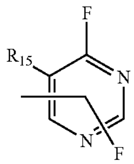
(vi)
or
-continued
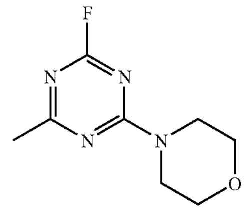
(vii)
wherein
$R_{15}$ is H or chlorine,
Y is defined above.
* * * * *